(12) United States Patent
Lee et al.

(10) Patent No.: US 9,699,101 B2
(45) Date of Patent: Jul. 4, 2017

(54) SWITCH DEVICE, INFORMATION PROCESSING SYSTEM, AND METHOD FOR CONTROLLING SWITCH DEVICE

(71) Applicant: FUJITSU LIMITED, Kawasaki-shi, Kanagawa (JP)

(72) Inventors: Chunghan Lee, Kawasaki (JP); Yukihiro Nakagawa, Kawasaki (JP); Takeshi Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 155 days.

(21) Appl. No.: 14/631,411

(22) Filed: Feb. 25, 2015

(65) Prior Publication Data
US 2015/0281102 A1    Oct. 1, 2015

(30) Foreign Application Priority Data

Mar. 25, 2014 (JP) ................. 2014-062566

(51) Int. Cl.
*H04L 12/801* (2013.01)
*H04L 12/863* (2013.01)
*H04L 12/835* (2013.01)

(52) U.S. Cl.
CPC ............ *H04L 47/29* (2013.01); *H04L 47/115* (2013.01); *H04L 47/30* (2013.01); *H04L 47/621* (2013.01); *H04L 47/33* (2013.01)

(58) Field of Classification Search
CPC ..... H04L 47/115; H04L 47/30; H04L 47/621; H04L 47/29; H04L 47/33
See application file for complete search history.

(56) References Cited

U.S. PATENT DOCUMENTS

| 9,294,402 B2* | 3/2016 | Yamaguchi ........... H04L 49/109 |
| 2013/0235729 A1 | 9/2013 | Mutoh et al. |
| 2013/0237529 A1 | 9/2013 | Okatsu et al. |
| 2014/0254357 A1* | 9/2014 | Agarwal ................. H04L 47/12 370/229 |

FOREIGN PATENT DOCUMENTS

| JP | 2009-177658 | 8/2009 |
| JP | 2013-191931 | 9/2013 |

\* cited by examiner

*Primary Examiner* — Omar Ghowrwal
(74) *Attorney, Agent, or Firm* — Staas & Halsey LLP

(57) ABSTRACT

A switch device includes a receiving buffer, a switching processing unit, a determining unit, a generating unit, and a transmitting unit. The receiving buffer receives a data packet from a communication device. The switching processing unit stores the data packet received by the receiving buffer to one of a plurality of output queues provided for respective transmission ports based on the destination. The determining unit determines whether the amount of data in the output queues is equal to or more than a predetermined threshold. If the determining unit determines that the amount of data in any one of the output queues is equal to or more than the predetermined threshold, the generating unit generates a notifying packet for notifying that congestion has occurred. The transmitting unit transmits the notifying packet generated by the generating unit to another switch device.

9 Claims, 18 Drawing Sheets

3020

| 3021 | 3022 | | | 3023 | 3024 |
|---|---|---|---|---|---|
| Flow_ID | Dst_MAC | Src_MAC | ··· | Flow_Count | E-flag |
| F001 | *** | *** | ··· | 0.15 | 0 |
| F002 | *** | *** | ··· | 2048 | 1 |
| F003 | *** | *** | ··· | 0.3 | 0 |
| ⋮ | ⋮ | ⋮ | ⋮ | ⋮ | ⋮ |

440

| 441 | 442 | 443 | 444 | 445 |
|---|---|---|---|---|
| Index | TIME OF OCCURRENCE | SW_ID | OUTPUT QUEUE | EXTERNAL PORT |
| 0000 | 1384870620 | *** | *** | *** |
| 0001 | 1385545873 | *** | *** | *** |
| 0002 | 1386555214 | *** | *** | *** |
| ⋮ | ⋮ | ⋮ | ⋮ | ⋮ |

SWITCH DEVICE, INFORMATION PROCESSING SYSTEM, AND METHOD FOR CONTROLLING SWITCH DEVICE

CROSS-REFERENCE TO RELATED APPLICATION

This application is based upon and claims the benefit of priority of the prior Japanese Patent Application No. 2014-062566, filed on Mar. 25, 2014, the entire contents of which are incorporated herein by reference.

FIELD

The embodiments discussed herein are related to a switch device, an information processing system, and a method for controlling a switch device.

BACKGROUND

A switch device that switches data packets flowing through a communication network sometimes becomes congested when data packets concentrate. In a known technology for resolving congestion in a switch device, a communication device serving as a transmitter of data packets is caused to reduce the current congestion window size to a predetermined size when congestion occurs. It is also known that the flows in the Internet traffic have a data packet distribution in which a large number of mouse flows, each containing a small number of data packets, are intermixed with a small number of elephant flows, each containing a large number of data packets. Related art examples are disclosed in Japanese Laid-open Patent Publication No. 2013-191931 and Japanese Laid-open Patent Publication No. 2009-177658.

When the size of the congestion window is reduced when congestion occurs, data packets will be transmitted at a lower transmission rate. If the data packets are transmitted at a lower transmission rate, it will take a longer time for the data transmission to be completed for an elephant flow with a larger amount of data, compared with a mouse flow with a smaller amount of data. The throughput of the data transmitted by an elephant flow is therefore affected more, when the data packets included in a mouse flow and those included in an elephant flow are controlled consistently by reducing the congestion window size. Furthermore, when a smaller congestion window size is used, even a mouse flow with a small amount of data is transmitted at a lower transmission rate, and the resultant throughput might be reduced. In this manner, congestion control using a congestion window has been sometimes difficult to handle data packets efficiently.

SUMMARY

According to an aspect of an embodiment, a switch device receiving a data packet from a transmitter device and transmitting the data packet to a receiver device includes a receiving unit, a storing unit, a determining unit, a generating unit, and a transmitting unit. The receiving unit receives the data packet from the transmitter device. The storing unit stores the data packet received by the receiving unit in one of a plurality of output queues provided for respective transmission ports based on the destination of the data packet. The determining unit determines whether the amount of data in any one of the output queues is equal to or more than a predetermined threshold. The generating unit generates a notifying packet for notifying that congestion has occurred when the determining unit determines that the amount of data in any one of the output queues is equal to or more than the predetermined threshold. The transmitting unit transmits the notifying packet generated by the generating unit to another switch device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred Embodiments of the Present Invention will be explained with reference to accompanying drawings. The embodiments described below are not intended to limit the scope of the technologies according to the application in any way. These embodiments may also be combined as appropriate, within the scope in which the processes are not contradictory.

[a] First Embodiment

Figure 1:
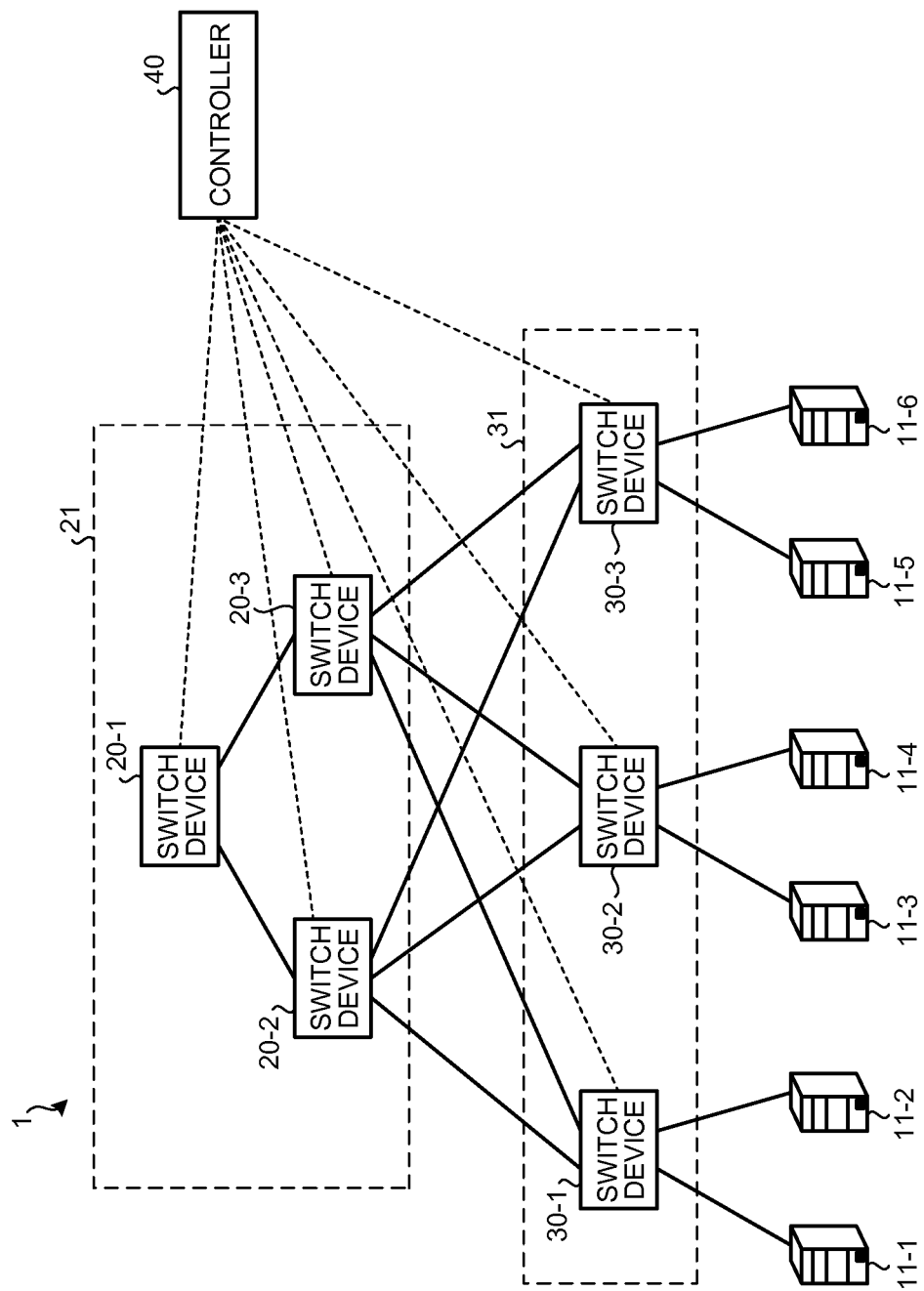
FIG. 1 is a schematic illustrating an example of an information processing system according to a first embodiment.

FIG. 1 is a schematic illustrating an example of an information processing system 1 according to a first embodiment. The information processing system 1 includes a plurality of switch devices 20-1 to 20-3, a plurality of switch devices 30-1 to 30-3, a plurality of communication devices 11-1 to 11-6, and a controller 40. The information processing system 1 is deployed in a data center, for example. The communication devices 11-1 to 11-6 are servers, for example. Hereinafter, the switch devices 20-1 to 20-3 are generally referred to as switch devices 20 when each of the switch devices 20-1 to 20-3 is not distinguished from one another. The switch devices 30-1 to 30-3 are also generally referred to as switch devices 30 when each of the switch devices 30-1 to 30-3 is not distinguished from one another. The communication devices 11-1 to 11-6 are generally referred to as communication devices 11 when each of communication devices 11-1 to 11-6 is not distinguished from one another.

The information processing system 1 includes, for example, an upper-level switch group 21 consisting of a plurality of spine switches, for example, and a lower-level switch group 31 consisting of a plurality of leaf switches, for example. The upper-level switch group 21 includes a plurality of switch devices 20, for example, and the lower-level switch group 31 includes a plurality of switch devices 30, for example. Each of the switch devices 30 is connected to two or more of the switch devices 20-1 to 20-3, and each of the switch devices 30 is connected to the communication devices 11. The switch devices 20 and the switch devices 30 together form a fat tree topology, for example.

Each of the switch devices 20 and the switch devices 30 has a function for learning addresses to allow a mapping relation to be established between the source media access control (MAC) address specified in a received data packet and an external port at which the data packet is received, and for retaining the mapping relation in a forwarding database (FDB), for example. When a data packet is received, the corresponding switch device 20 or the corresponding switch device 30 refers to the FDB, and transmits the data packet from the external port mapped to the destination MAC address specified in the received data packet.

The controller 40 is connected to each of the switch devices 20 and the switch devices 30, and controls each of the switch devices 20 and the switch devices 30. In this embodiment, the controller 40 is a software-defined network (SDN) controller, for example, and the switch devices 20 and the switch devices 30 are SDN-compatible switches, for example.

The controller 40 transmits a flow table to the switch devices 20 and the switch devices 30. The flow table describes information such as information for identifying each flow including a series of data packets to be transmitted from a source communication device 11 to a destination communication device 11. Each of the switch devices 20 and the switch devices 30 retains the flow table received from the controller 40, and identifies the flow including a received data packet with reference to the retained flow table.

Block Diagram of Switch Device 20

Figure 2:
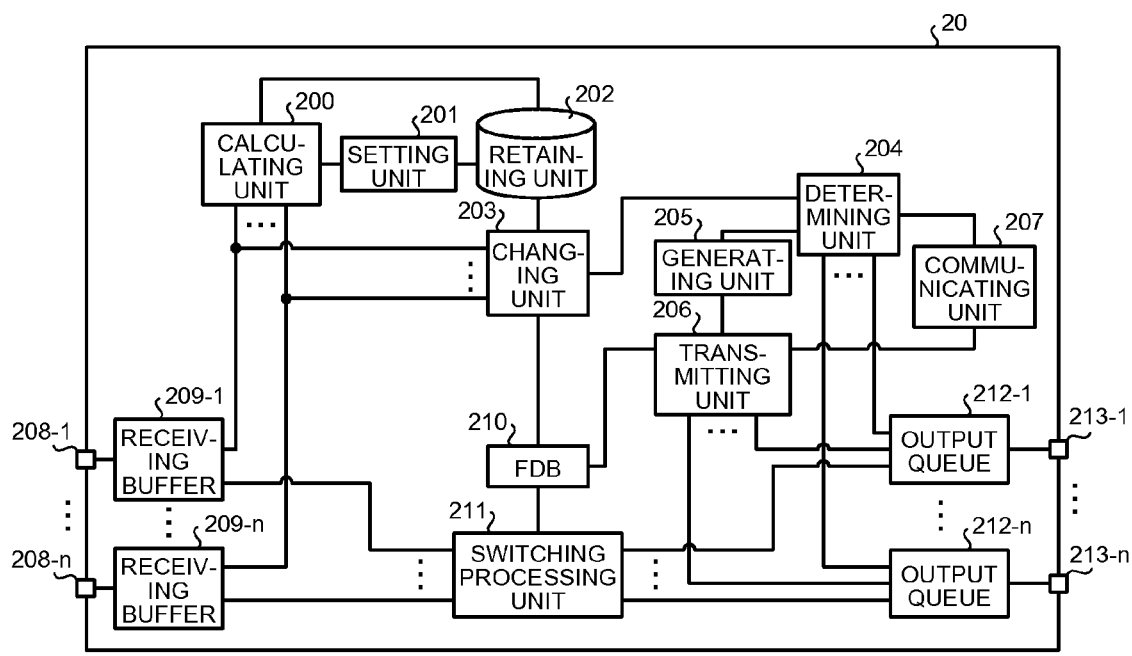
FIG. 2 is a block diagram illustrating an example of an upper-level switch device according to the first embodiment.

FIG. 2 is a block diagram illustrating an example of the upper-level switch device 20 according to the first embodiment. The switch device 20 includes a calculating unit 200, a setting unit 201, a retaining unit 202, a changing unit 203, a determining unit 204, a generating unit 205, a transmitting unit 206, and a communicating unit 207. The switch device 20 also includes a plurality of receiving ports 208-1 to 208-$n$, a plurality of receiving buffers 209-1 to 209-$n$, an FDB 210, a switching processing unit 211, a plurality of output queues 212-1 to 212-$n$, and a plurality of transmission ports 213-1 to 213-$n$.

Hereinafter, the receiving ports 208-1 to 208-$n$ are generally referred to as receiving ports 208 when each of the receiving ports 208-1 to 208-$n$ is not distinguished from one another, and the receiving buffers 209-1 to 209-$n$ are generally referred to as receiving buffers 209 when each of the receiving buffers 209-1 to 209-$n$ is not distinguished from one another. The output queues 212-1 to 212-$n$ are generally referred to as output queues 212 when each of the output queues 212-1 to 212-$n$ is not distinguished from one another, and the transmission ports 213-1 to 213-$n$ are generally referred to as transmission ports 213 when each of the transmission ports 213-1 to 213-$n$ is not distinguished from one another.

Figure 3:
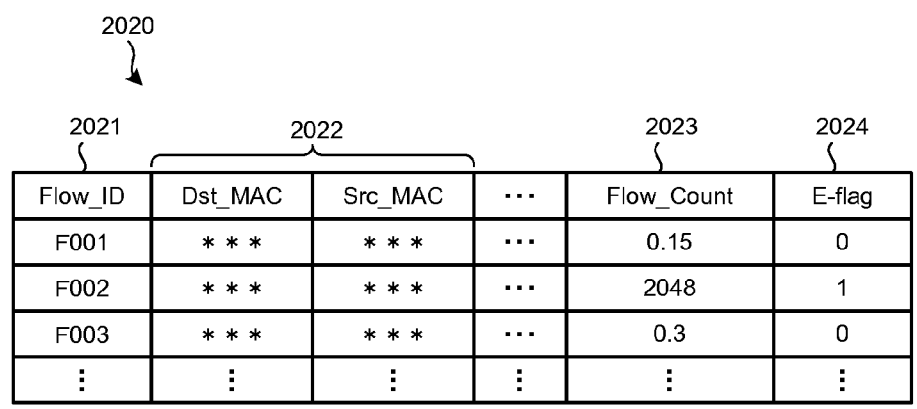
FIG. 3 is a schematic illustrating an example of a flow table.

The retaining unit 202 retains a flow table 2020 illustrated in FIG. 3, for example. FIG. 3 is a schematic illustrating an example of the flow table 2020. The flow table 2020 stores therein, for example, match fields 2022, a Flow_Count 2023, and an E-flag 2024, in a manner mapped to a Flow_ID 2021 that identifies a flow, as illustrated in FIG. 3.

The match fields 2022 store therein information for identifying a series of data packets included in the corresponding flow, e.g., the destination MAC address (Dst_MAC) and the source MAC address (Src_MAC) of a data packet included in the corresponding flow. The Flow_Count 2023 stores therein information indicating a cumulative amount of data in the data packets included in the corresponding flow.

The E-flag 2024 stores therein "1" when the cumulative amount of data in the data packets included in the flow is equal to or more than a predetermined threshold, e.g., 1 megabyte, and stores therein "0" when the cumulative amount of data in the data packets included in the flow is less than the predetermined threshold. Hereinafter, when the cumulative amount of data to be forwarded for is equal to or more than the predetermined threshold, e.g., 1 megabyte, the flow is referred to as an elephant flow, and when the cumulative amount of data to be forwarded is less than predetermined threshold, the a flow is referred to as a mouse flow.

The receiving buffers 209 are provided for the respective receiving ports 208, and receive data packets via the respective receiving ports 208. Each of the receiving buffers 209 is an example of a receiving unit. The output queues 212 are provided for the respective transmission ports 213, and transmit the data packets received from the switching processing unit 211 via the respective transmission ports 213, on the first-in, first-out basis. Each of the receiving ports 208 is connected to an external port to which corresponding one of the transmission ports 213 is connected.

When the receiving buffers 209 receive a data packet, the switching processing unit 211 is caused to map and to register the source MAC address specified in the data packet to the information of the external port corresponding to that receiving buffer 209 in the FDB 210. If the destination MAC address specified in the data packet is registered in the FDB 210, the switching processing unit 211 stores the data packet in the output queue 212 corresponding to the external port mapped to the destination MAC address. If the destination MAC address specified in the data packet is not registered in the FDB 210, the switching processing unit 211 stores copies of the data packet in all of the respective output queues 212, except for the output queue 212 corresponding to the transmission port 213 connected to the external port from which the data packet is received. The switching processing unit 211 is an example of a storing unit.

When the receiving buffers 209 receive a data packet, the calculating unit 200 is caused to identify a Flow_ID of the flow including the data packet, based on the match fields in the flow table 2020 and the header information of the data packet. The calculating unit 200 then identifies the Flow_Count that is mapped to the identified Flow_ID from the flow table 2020.

The calculating unit 200 then updates the Flow_Count by adding the amount of data in the data packet received by the receiving buffer 209 to the identified Flow_Count. The setting unit 201 monitors the Flow_Count in the flow table 2020, and sets "1" to the corresponding E-flag when the Flow_Count becomes equal to or more than the predetermined threshold.

The determining unit 204 monitors the amount of data in each of the output queues 212, and determines whether the amount of data in any one of the output queues 212 is equal to or more than the predetermined threshold. The predetermined threshold is, for example, 65 packets, when the transmission rate of the transmission port 213 is 10 gigabits per second, for example. If the determining unit 204 determines that the amount of data in any one of the output queues 212 is equal to or more than the predetermined threshold, that is, if congestion has occurred in any one of the output queues 212, the determining unit 204 sends information of the output queue 212 in which the amount of data is equal to or more than the predetermined threshold to the generating unit 205 and to the communicating unit 207. The determining unit 204 also sends the information of the output queue 212 in which amount of data has become equal to or more than the predetermined threshold, together with the information indicating the occurrence of congestion, to the changing unit 203.

When a congestion confirmation request including an Index and information of an output queue is received from the communicating unit 207, the determining unit 204 determines whether the amount of data in the output queue 212 identified by the information included in the congestion confirmation request is equal to or more than the predetermined threshold. If the determining unit 204 determines that the amount of data is equal to or more than the predetermined threshold, the determining unit 204 sends a congestion confirmation response including information indicating the occurrence of congestion and the Index, together with the information of the output queue 212 in which the amount of data is determined to be equal to or more than the predetermined threshold, to the communicating unit 207. If the determining unit 204 determines that the amount of data in the output queue 212 is less than the predetermined threshold, the determining unit 204 sends a congestion confirmation response including information indicating a relief of congestion and the Index to the communicating unit 207.

Figure 4:
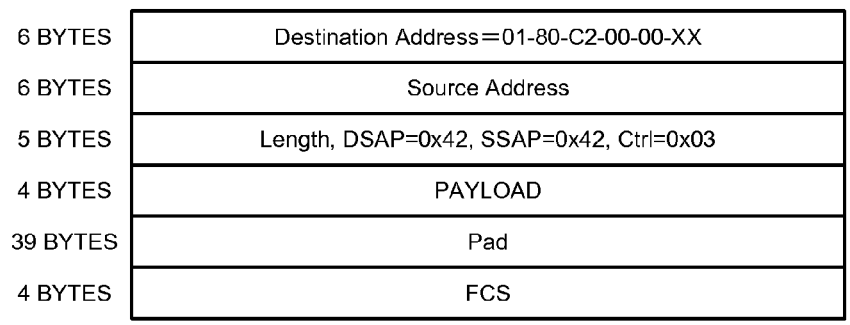
FIG. 4 is a schematic illustrating an example of a notifying packet.

When the information of the output queue 212 in which the amount of data is equal to or more than the predetermined threshold is received from the determining unit 204, the generating unit 205 generates a notifying packet for notifying that congestion has occurred. The generating unit 205 sends the generated notifying packet and the information of the output queue 212 in which the amount of data is equal to or more than the predetermined threshold to the transmitting unit 206. FIG. 4 is a schematic illustrating an example of a notifying packet. The generating unit 205 generates the notifying packet using a protocol data unit (PDU) specified in Institute of Electrical and Electronics Engineers (IEEE) 802.1Q, for example. In the destination address of the notifying packet, a reserved MAC address (01-80-C2-00-00-XX) is stored. In the payload of the notifying packet, the information indicating the occurrence of congestion is stored.

When the notifying packet and the information of the output queue 212 in which the amount of data is equal to or more than the predetermined threshold are received from the generating unit 205, the transmitting unit 206 identifies the source MAC address for each of the data packets stored in the output queue 212. The transmitting unit 206 then identifies the external port mapped to each of the identified MAC addresses by referring to the FDB 210. The transmitting unit 206 stores the notifying packet received from the generating unit 205 in the output queues 212 corresponding to the identified external ports. This process allows the notifying packet to be transmitted from the external ports identified by the transmitting unit 206. The transmitting unit 206 also transmits the information of the identified external ports to the communicating unit 207.

The communicating unit 207 receives the information of the output queue 212 in which the amount of data is equal to or more than the predetermined threshold from the determining unit 204. When the information of the external ports is received from the transmitting unit 206, the communicating unit 207 generates a congestion notification including the information of the output queue 212 in which the amount of data is equal to or more than the predetermined threshold and the information of the external ports. The communicating unit 207 transmits the generated congestion notification and the identification information of the switch device 20 to the controller 40. When a congestion confirmation request is received from the controller 40, the communicating unit 207 sends the congestion confirmation request to the determining unit 204. When the congestion confirmation response is received from the determining unit 204, the communicating unit 207 transmits the received congestion confirmation response to the controller 40.

The changing unit 203 retains, when the information of the output queue 212 is received from the determining unit 204, the external port corresponding to the output queue 212 as the congested port. When the congested port is already retained, the changing unit 203 adds the external port corresponding to the output queue 212 received from the determining unit 204 as a congested port.

Every time the receiving buffers 209 receive a data packet, the changing unit 203 identifies the external port from which the data packet is to be transmitted, by referring to the FDB 210 using the destination MAC address of the data packet. The changing unit 203 then determines whether the identified external port matches any one of the ports retained as the congested ports.

If the identified external port matches any one of the ports retained as the congested ports, the changing unit 203 identifies the Flow_ID of the flow including the data packet from the flow table 2020 using the header information of the data packet. The changing unit 203 then determines whether the E-flag mapped to the identified Flow_ID is "0", that is, if the flow corresponding to the identified Flow_ID is a mouse flow. If the E-flag is "0", the changing unit 203 selects one of the external ports connected to the other switch devices 20 or 30, excluding the congested ports.

The changing unit 203 selects the external port having a largest available bandwidth, for example, among the external ports connected to the other switch devices 20 or 30, excluding the congested ports. As other examples, the changing unit 203 may select the external port in which the longest time has elapsed from when the last data packet has been transmitted, or the external port that is used least frequently, among the external ports connected to the other switch devices 20 or 30, excluding the congested ports. The changing unit 203 may also select one of the external ports that are connected to the other switch devices 20 or 30, excluding the congested ports, one by one on the round-robin, or select one of such external ports randomly using a random number.

The changing unit 203 then causes the switching processing unit 211 to change the output queue in which a data packet is to be stored, by rewriting the information of the external port mapped to the destination MAC address of the data packet to the selected external port in the FDB 210. The switching processing unit 211 then stores the data packet in the output queue 212 corresponding to the external port with which the FDB is rewritten.

When the information indicating a relief of congestion is received with the information of the output queue 212 from the determining unit 204, the changing unit 203 identifies the external port mapped to the received output queue 212. The changing unit 203 then excludes the identified external port from the congested ports, and reverts the information of the external port to that of before the information is rewritten in the FDB 210. This process allows the switching processing unit 211 to store the data packets included in a mouse flow in the output queue 212 that is no longer congested.

If the switching processing unit 211 identifies the external port with which the FDB is rewritten as an external port corresponding to the destination specified in a data packet while one of the output queues 212 is being congested, the switching processing unit 211 may further determine whether the data packet is included in an elephant flow. If the data packet is included in an elephant flow, the switching processing unit 211 may then change the identified external port to the external port before the information is rewritten, and store the data packet in the output queue 212 corresponding to the changed external port. In this manner, even when data packets included in an elephant flow and included in a mouse flow are both addressed to the same destination, the transmission path can be changed only for the data packet included in the mouse flow, while maintaining the transmission path for the data packet included in the elephant flow.

As another example, even if any one of the output queues 212 is congested, the changing unit 203 need not change the data in the FDB 210, and the switching processing unit 211 may identify the external port mapped to the destination of a data packet by referring to the FDB 210. If the data packet is included in a mouse flow, the switching processing unit 211 may then store the data packet in an output queue 212 corresponding to an external port other than the identified external port.

Block Diagram of Switch Device 30

Figure 5:
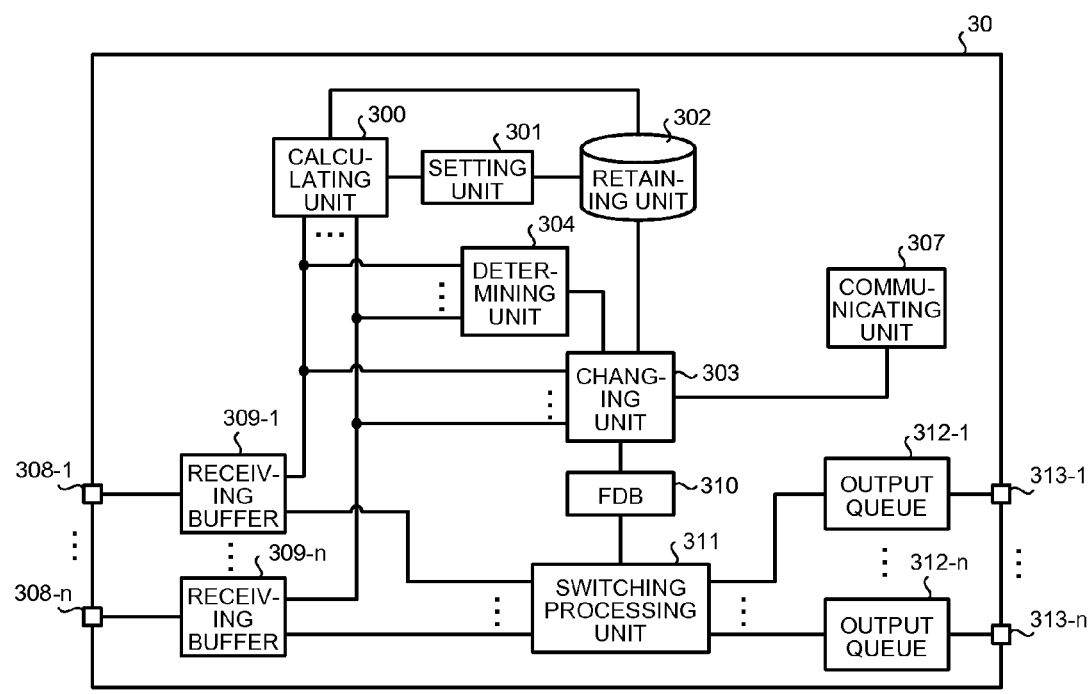
FIG. 5 is a block diagram illustrating an example of a lower-level switch device according to the first embodiment.

FIG. 5 is a block diagram illustrating an example of the lower-level switch device 30 according to the first embodiment. The switch device 30 includes a calculating unit 300, a setting unit 301, a retaining unit 302, a changing unit 303, a determining unit 304, and a communicating unit 307. The switch device 30 also includes a plurality of receiving ports 308-1 to 308-$n$, a plurality of receiving buffers 309-1 to 309-$n$, an FDB 310, a switching processing unit 311, a plurality of output queues 312-1 to 312-$n$, and a plurality of transmission ports 313-1 to 313-$n$.

Hereinafter, the receiving ports 308-1 to 308-$n$ are generally referred to as receiving ports 308 when each of the receiving ports 308-1 to 308-$n$ is not distinguished from one another, and the receiving buffers 309-1 to 309-$n$ are generally referred to as receiving buffers 309 when each of the receiving buffers 309-1 to 309-$n$ is not distinguished from one another. The output queues 312-1 to 312-$n$ are generally referred to as output queues 312 when each of the output queues 312-1 to 312-$n$ is not distinguished from one another, and the transmission ports 313-1 to 313-$n$ are generally referred to as transmission ports 313 when each of the transmission ports 313-1 to 313-$n$ is not distinguished from one another.

Figures 6, 7, 8:
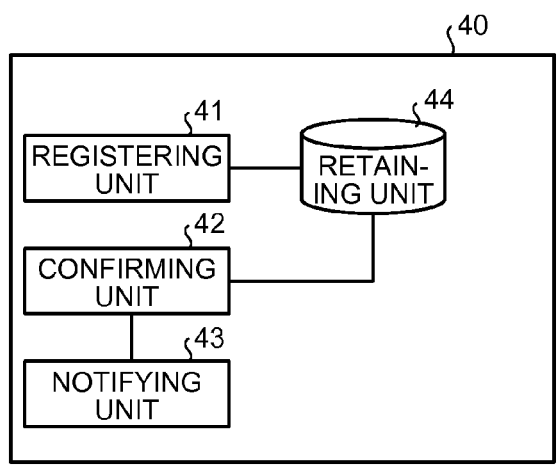
FIG. 6 is a schematic illustrating an example of a flow table.
FIG. 7 is a block diagram illustrating an example of a controller according to the first embodiment.
FIG. 8 is a schematic illustrating an example of a congestion table.

The retaining unit 302 retains a flow table 3020 illustrated in FIG. 6, for example. FIG. 6 is a schematic illustrating an example of the flow table 3020. The flow table 3020 stores therein, for example, match fields 3022, a Flow_Count 3023, and an E-flag 3024, in a manner mapped to a Flow_ID 3021 that identifies a flow, as illustrated in FIG. 6.

The match fields 3022 store therein information for identifying a series of data packets included in the corresponding flow, e.g., the destination MAC address (Dst_MAC) and the source MAC address (Src_MAC) of the data packets. The Flow_Count 3023 stores therein information indicating a cumulative amount of data in the data packets included in the flow. The E-flag 3024 stores therein "1" when the cumulative amount of data in the data packets included in the flow is equal to or more than the predetermined threshold, e.g., 1 megabyte, for example, and stores therein "0" when the cumulative amount of data in the data packets included in the flow is less than the predetermined threshold.

The receiving buffers 309 are provided for the respective receiving ports 308, and receive data packets via the respective receiving ports 308. Each of the receiving buffers 309 is an example of the receiving unit. The output queues 312 are provided for the respective transmission ports 313, and transmit the data packets received from the switching processing unit 311 via the respective output queues 312, on the first-in, first-out basis. Each of the receiving ports 308 is connected to an external port to which corresponding one of the transmission ports 313 is connected.

When the receiving buffers 309 receive a data packet, the switching processing unit 311 maps and registers the source MAC address specified in the data packet and the information of the external port corresponding to the receiving buffer 309 in the FDB 310. If the destination address specified in the data packet is registered in the FDB 310, the switching processing unit 311 stores the data packet in the output queue 312 corresponding to the external port mapped to the destination address. The switching processing unit 311 is an example of the storing unit.

When the receiving buffers 309 receive a data packet, the calculating unit 300 identifies the Flow_ID of the flow including the data packet, based on the match fields in the retaining unit 302 and the header information of the data packet. The calculating unit 300 then identifies the Flow_Count mapped to the identified Flow_ID in the flow table 3020.

The calculating unit 300 then updates the Flow_Count by adding the amount of data of the data packet received by the receiving buffer 309 to the identified Flow_Count. The setting unit 301 monitors the Flow_Count in the flow table 3020, and sets "1" to the corresponding E-flag when the Flow_Count becomes equal to or more than the predetermined threshold.

The determining unit 304 monitors the data packets received by each of the receiving buffers 309, and determines whether the data packet received by the corresponding receiving buffer 309 is a notifying packet. If the data packet received by the receiving buffer 309 is a notifying packet, the determining unit 304 identifies the external port corresponding to the receiving buffer 309 at which the notifying packet is received. The determining unit 304 then sends the information of the identified external port to the changing unit 303.

When a congestion relief notification including the information of the external port is received from the controller 40, the communicating unit 307 sends the information of the external port included in the received congestion relief notification to the changing unit 303.

When the information of the external port is received from the determining unit 304, the changing unit 303 retains the external port specified in the received information as a congested port. When another congested port is already retained, the changing unit 303 adds the external port received from the determining unit 304 as a congested port. Every time the receiving buffers 309 receive a data packet, the changing unit 303 identifies the external port from which the data packet is to be transmitted by referring to the FDB 310 based on the destinations MAC address of the data packet. The changing unit 303 then determines whether the identified external port matches any one of the ports retained as the congested ports.

If the identified external port matches any one of the ports retained as the congested ports, the changing unit 303 identifies the Flow_ID of the flow including the data packet by referring to the flow table 3020 based on the header information of the data packet. The changing unit 303 then identifies if the E-flag mapped to the identified Flow_ID is "0", that is, if the flow corresponding to the identified Flow_ID is a mouse flow. If the E-flag is "0", the changing unit 303 selects one of the external ports, excluding the congested ports, from the external ports connected to the other switch devices 20 or 30.

The changing unit 303 selects the external port having a largest available bandwidth, for example, among the external port connected to the other switch devices 20 or 30, excluding the congested ports. As other examples, the changing unit 303 may select the external port in which the longest time has elapsed from when the last data packet has been transmitted, or the external port that is used least frequently, among the external port connected to the other switch devices 20 or 30, excluding the congested ports. The changing unit 303 may also select one of the external ports that are connected to the other switch devices 20 or 30, excluding the congested ports, one by one on the round-robin, or select one of such external ports randomly using a random number.

The changing unit 303 then causes the switching processing unit 311 to change the output queue in which a data packet is to be stored by rewriting the information of the external port mapped to the destination MAC address of the data packet to the selected external port in the FDB 310. The switching processing unit 311 then stores the data packet in the output queue 312 corresponding to the external port with which the FDB is rewritten. When the switching processing unit 311 stores a data packet in the output queue 312 corresponding to the external port with which the FDB is rewritten, the changing unit 303 reverts the information of the external port to that of before the information is rewritten in the FDB 310.

When the information of the external port is received from the communicating unit 307, the changing unit 303 excludes the received information of the external port from the congested ports. This process allows the switching processing unit 311 to transmit a data packet included in a mouse flow to the switch device 20 having transmitted the notifying packet.

Block Diagram of Controller 40

FIG. 7 is a block diagram illustrating an example of the controller 40 according to the first embodiment. The controller 40 includes a registering unit 41, a confirming unit 42, a notifying unit 43, and a retaining unit 44.

The retaining unit 44 retains a congestion table 440 such as that illustrated in illustrated in FIG. 8. FIG. 8 is a schematic illustrating an example of the congestion table 440. The congestion table 440 stores therein time 442 at which the congestion has occurred, an SW_ID 443 that is the identification information of the switch device 20 in which the congestion has occurred, an output queue 444 in which the congestion has occurred, and an external port 445 from which the notifying packet is transmitted, in the manner mapped to an Index 441.

When a congestion notification is received from a switch device 20, the registering unit 41 determines whether the identification information of the switch device 20, the output queue, and the external port included in the received congestion notification are registered in the congestion table 440. If the identification information of the switch device 20, the output queue, and the external port included in the received congestion notification are not registered in the congestion table 440, the registering unit 41 assigns a new Index to the received congestion notification.

The registering unit 41 then registers the time at which the congestion notification was received as the time at which the congestion has occurred in the congestion table 440, in a manner mapped to the newly assigned Index 441. The registering unit 41 also registers the SW_ID, the output queue, and the external port in the congestion table 440, in a manner mapped to the newly assigned Index 441. If the identification information of the switch device 20, the output queue, and the external port included in the received congestion notification are already registered in the congestion table 440, the registering unit 41 does not register the information included in the received congestion notification to the congestion table 440.

The confirming unit 42 measures a predetermined time, e.g., 5 minutes, for each of the Indices in the congestion table 440. The confirming unit 42 then generates a congestion confirmation request including information of each of the Indices for which the predetermined time has elapsed, and information of the output queue mapped to the Index. The confirming unit 42 then transmits the generated congestion confirmation request to the switch device 20 corresponding to the SW_ID mapped to the Index for which the predetermined time has elapsed.

When the congestion confirmation response is received from the switch device 20 and the received congestion confirmation response includes the information indicating the state of being in congestion, the confirming unit 42 starts measuring the predetermined time, e.g., 5 minutes, for the Index included in the received congestion confirmation response. If the information indicating a relief of congestion is included in the congestion confirmation response received from the switch device 20, the confirming unit 42 sends the Index included in the received congestion confirmation response to the notifying unit 43.

When an Index is received from the confirming unit 42, the notifying unit 43 extracts the SW_ID and the information of the external port mapped to the received Index by referring to the congestion table 440 in the retaining unit 44. The notifying unit 43 then identifies the address of the switch device 30 that is connected to the extracted external port, and the information of the external port.

The controller 40 retains, for example, the identification information and the address information of the switch devices 20 and the switch devices 30, and topology of the information processing system 1 representing the connections between the switch devices 20, the switch devices 30, and the communication devices 11. The notifying unit 43 identifies the address of the switch device 30 that is connected to the extracted external port and the information of the external port by referring to the above information, for example.

The notifying unit 43 then transmits a congestion relief notification including the information of the identified external port and the identified address to the switch device 30. The notifying unit 43 then deletes the information of the time of occurrence, the SW_ID, the output queue, and the external port mapped to the Index received from the confirming unit 42, as well as the Index, from the congestion table 440.

Operation of Switch Device 20

Figure 9:
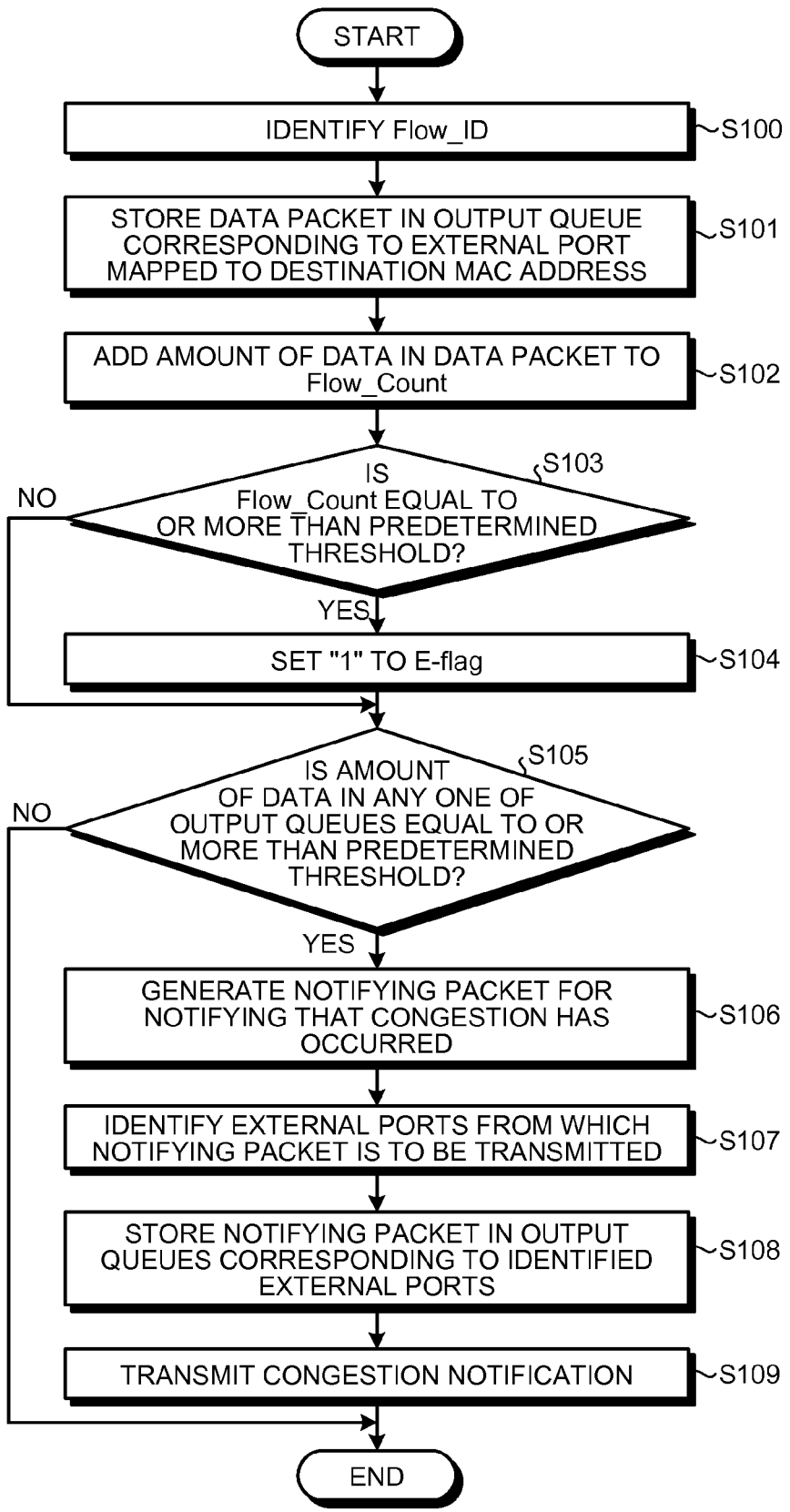
FIG. 9 is a flowchart illustrating an example of an operation of the upper-level switch device according to the first embodiment.

FIG. 9 is a flowchart illustrating an example of an operation of the upper-level switch device 20 according to the first embodiment. The switch device 20 starts the operation illustrated in this flowchart when a data packet is received.

To begin with, the calculating unit 200 identifies the Flow_ID of the flow including the data packet by referring to the match fields in the retaining unit 202 based on the header information of the data packet received by the receiving buffer 209 (Step S100). The switching processing unit 211 then refers to the FDB 210, and stores the data packet in the output queue 212 corresponding to the external port mapped to the destination MAC address specified in the data packet (Step S101).

The calculating unit 200 then identifies the Flow_Count mapped to the identified Flow_ID from the flow table 2020. The calculating unit 200 then updates the Flow_Count by adding the amount of data in the data packet received by the receiving buffer 209 to the identified Flow_Count (Step S102). The setting unit 201 then determines whether the Flow_Count after the addition is equal to or more than the predetermined threshold (Step S103).

If the Flow_Count is less than the predetermined threshold (No at Step S103), the determining unit 204 executes the process at Step S105. If the Flow_Count is equal to or more than the predetermined threshold (Yes at Step S103), the setting unit 201 sets the E-flag mapped to the Flow_Count to "1" (Step S104).

The determining unit 204 then determines whether the amount of data in any one of the output queues 212 is equal to or more than the predetermined threshold by referring to the amount of data in each of the output queues 212 (Step S105). If the amounts of data in all of the output queues 212 are less than the predetermined threshold (No at Step S105), the switch device 20 ends the operation illustrated in this flowchart.

If the amount of data in any one of the output queues 212 is equal to or more than the predetermined threshold (Yes at Step S105), the determining unit 204 transmits the information of the output queue 212 in which the amount of data is equal to or more than the predetermined threshold to the generating unit 205 and to the communicating unit 207. The determining unit 204 also sends the information of the output queue 212 in which the amount of data is equal to or more than the predetermined threshold and the information indicating the occurrence of congestion to the changing unit 203.

The generating unit 205 then generates a notifying packet for notifying that congestion has occurred (Step S106), and sends the generated notifying packet and the information of the output queue 212 in which the amount of data is equal to or more than the predetermined threshold to the transmitting unit 206.

The transmitting unit 206 then identifies the source MAC address of each of the data packets stored in the output queue 212 in which the amount of data is equal to or more than the predetermined threshold, by referring to the header of the corresponding data packet. The transmitting unit 206 then identifies the external ports mapped to each of the identified MAC addresses by referring to the FDB 210 (Step S107). The transmitting unit 206 then stores the notifying packet received from the generating unit 205 in the output queues 212 corresponding to the identified external ports (Step S108). This process allows the notifying packet to be transmitted from the external ports corresponding to the output queues 212. The transmitting unit 206 then transmits the information of the identified external ports to the communicating unit 207.

The communicating unit 207 then generates a congestion notification including the information of the output queue 212 received from the determining unit 204 and the information of the external ports received from the transmitting unit 206. The communicating unit 207 then transmits the generated congestion notification and the identification information of the switch device 20 to the controller 40 (Step S109), and the switch device 20 ends the operation illustrated in this flowchart.

Figure 10:
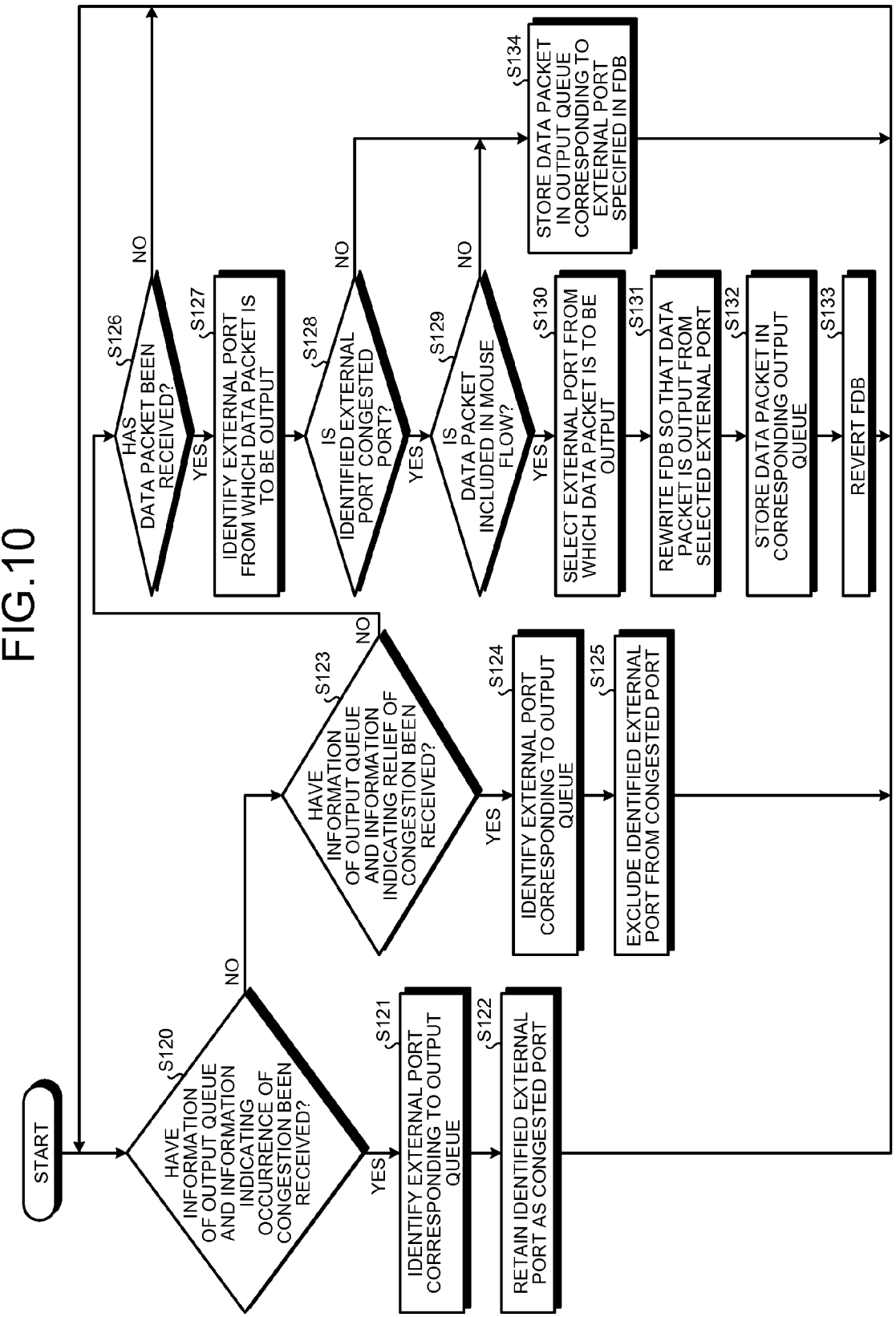
FIG. 10 is a flowchart illustrating an example of another operation of the upper-level switch device according to the first embodiment.

FIG. 10 is a flowchart illustrating an example of an operation of the upper-level switch device 20 according to the first embodiment.

To begin with, the changing unit 203 determines whether the information of the output queue and the information indicating the occurrence of congestion have been received from the determining unit 204 (Step S120). If the information of the output queue and the information indicating the occurrence of congestion have been received from the determining unit 204 (Yes at Step S120), the changing unit 203 identifies the external port corresponding to the received output queue 212 (Step S121). The changing unit 203 then retains the identified external port as a congested port (Step S122), and repeats the process at Step S120.

If the information of the output queue and the information indicating the occurrence of congestion have not been received from the determining unit 204 (No at Step S120), the changing unit 203 determines whether the information of the output queue and the information indicating a relief of congestion have been received from the determining unit 204 (Step S123). If the information of the output queue and the information indicating a relief of congestion have been received from the determining unit 204 (Yes at Step S123), the changing unit 203 identifies the external port corresponding to the received output queue 212 (Step S124). The changing unit 203 then excludes the identified external port from the congested ports (Step S125), and repeats the process at Step S120.

If the information of the output queue and the information indicating a relief of congestion have not been received from the determining unit 204 (No at Step S123), the changing unit 203 determines whether the receiving buffers 209 have received a data packet (Step S126). If the receiving buffer 209 has not received a data packet (No at Step S126), the changing unit 203 repeats the process at Step S120.

If the receiving buffers 209 have received a data packet (Yes at Step S126), the changing unit 203 identifies the external port from which the data packet is to be output by referring to the FDB 210 based on the destination MAC address specified in the data packet (Step S127). The changing unit 203 then determines whether the identified external port matches any one of the ports retained as the congested ports (Step S128).

If the identified external port does not match any one of the ports retained as the congested ports (No at Step S128), the switching processing unit 211 identifies the output queue 212 based on the FDB 210. The switching processing unit 211 then stores the data packet in the identified output queue 212 (Step S134), and the changing unit 203 repeats the process at Step S120.

If the identified external port matches any one of the ports retained as the congested ports (Yes at Step S128), the changing unit 203 identifies the Flow_ID of the flow including the data packet by referring to the flow table 2020 based on the header information of the data packet. The changing unit 203 then determines whether the E-flag mapped to the identified Flow_ID is "0", that is, if the data packet is included in a mouse flow (Step S129). If the data packet is not included in a mouse flow (No at Step S129), the switching processing unit 211 executes the process at Step S134.

If the data packet is included in a mouse flow (Yes at Step S129), the changing unit 203 selects one external port for outputting the data packet, from the external ports that are connected to the other switch devices 20 or 30, excluding the congested ports (Step S130). The changing unit 203 then rewrites the information of the external port mapped to the destination MAC address of the data packet to the selected external port in the FDB 210 (Step S131).

The switching processing unit 211 then stores the data packet in the output queue 212 corresponding to the transmission port 213 connected to the external port with which the FDB is rewritten (Step S132). The changing unit 203 then reverts the information of the external port to that of before the information is rewritten in the FDB 210 (Step S133), and repeats the process at Step S120.

Operation of Switch Device 30

Figure 11:
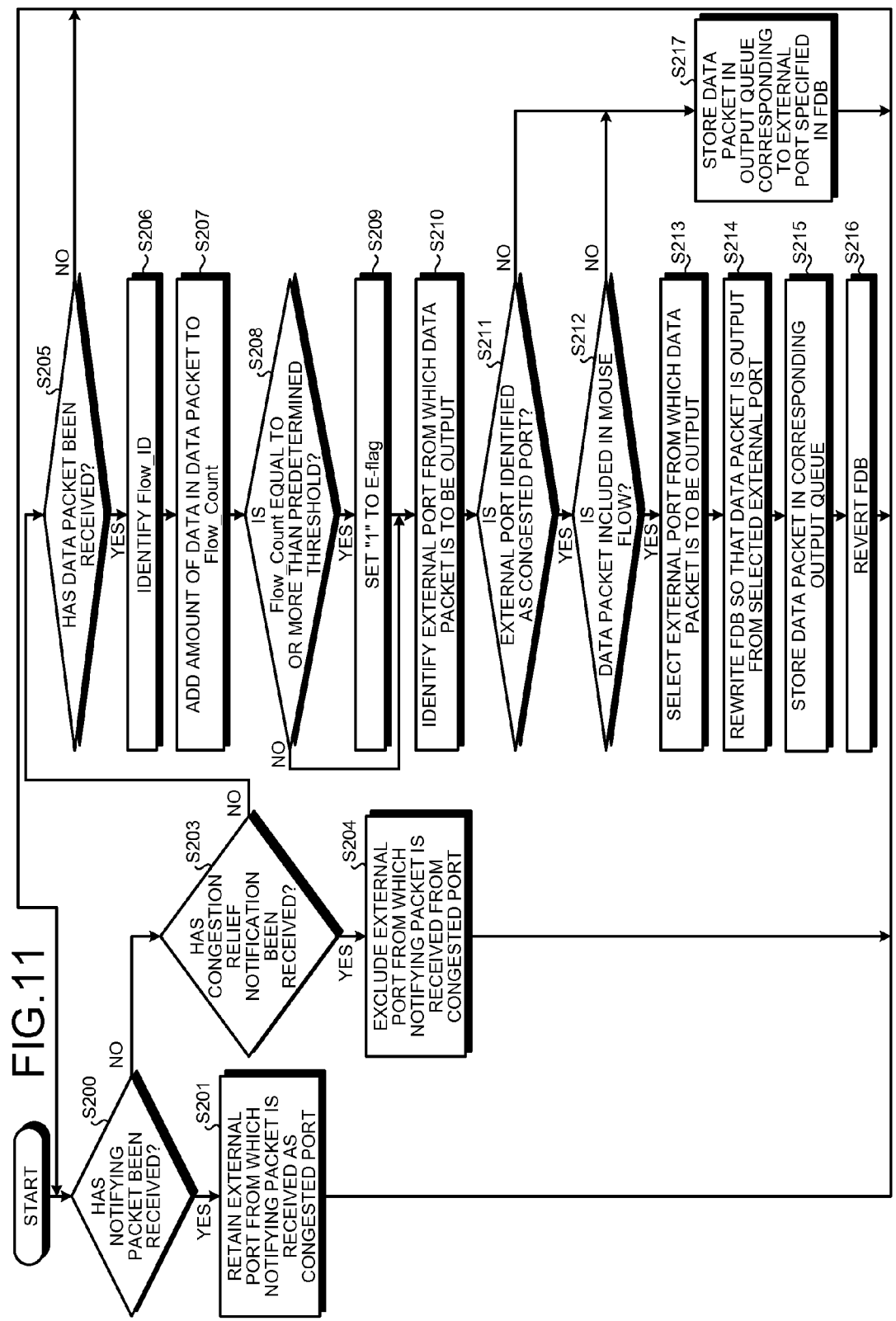
FIG. 11 is a flowchart illustrating an example of an operation of the lower-level switch device according to the first embodiment.

FIG. 11 is a flowchart illustrating an example of an operation of the lower-level switch device 30 according to the first embodiment.

To begin with, the determining unit 304 determines whether the receiving buffer 309 has received a notifying packet (Step S200). If the receiving buffer 309 has received a notifying packet (Yes at Step S200), the determining unit 304 identifies the external port connected to the receiving port 308 corresponding to the receiving buffer 309 at which the notifying packet is received. The determining unit 304 then sends the information of the identified external port to the changing unit 303. The changing unit 303 retains the information of the external port received from the determining unit 304 as the information of the congested port (Step S201), and the determining unit 304 repeats the process at Step S200.

If the receiving buffer 309 has not received a notifying packet (No at Step S200), the communicating unit 307 determines whether a congestion relief notification has been received from the controller 40 (Step S203). When a congestion relief notification has been received (Yes at Step S203), the communicating unit 307 sends the information of the external port included in the received congestion relief notification to the changing unit 303. The changing unit 303 then excludes the information of the external port received from the communicating unit 307 from the information of the congested ports (Step S204), and the determining unit 304 repeats the process at Step S200.

If no congestion relief notification has been received (No at Step S203), the calculating unit 300 determines whether the receiving buffers 309 have received a data packet (Step S205). If the receiving buffer 309 has not received a data packet (No at Step S205), the determining unit 304 repeats the process at Step S200.

If the receiving buffers 309 have received a data packet (Yes at Step S205), the calculating unit 300 identifies the Flow_ID of the flow including the data packet based on the match fields in the retaining unit 302 and the header information of the data packet (Step S206). The calculating unit 300 then identifies the Flow_Count mapped to the identified Flow_ID in the flow table 3020.

The calculating unit 300 then updates the Flow_Count by adding the amount of data in the data packet received by the receiving buffer 309 to the identified Flow_Count (Step S207). The setting unit 301 then determines whether the Flow_Count after the addition is equal to or more than the predetermined threshold (Step S208).

If the Flow_Count is less than the predetermined threshold (No at Step S208), the changing unit 303 executes the process at Step S210. If the Flow_Count is equal to or more than the predetermined threshold (Yes at Step S208), the setting unit 301 sets the E-flag mapped to the Flow_Count to "1" (Step S209).

The changing unit 303 then identifies the external port from which the data packet is to be transmitted by referring to the FDB 310 based on the destination MAC address specified in the data packet (Step S210). The changing unit 303 then determines whether the identified external port matches any one of the ports retained as the congested ports (Step S211).

If the identified external port does not match any one of the ports retained as the congested ports (No at Step S211), the switching processing unit 311 identifies the output queue 312 based on the FDB 310. The switching processing unit 311 then stores the data packet in the identified output queue 312 (Step S217), and the determining unit 304 repeats the process at Step S200.

If the identified external port matches any one of the ports retained as the congested ports (Yes at Step S211), the changing unit 303 identifies the Flow_ID of the flow including the data packet by referring to the flow table 3020 based on the header information of the data packet. The changing unit 303 then determines whether the E-flag mapped to the identified Flow_ID is "0", that is, if the data packet is included in a mouse flow (Step S212). If the data packet is not included in a mouse flow (No at Step S212), the switching processing unit 311 executes the process at Step S217.

If the data packet is included in a mouse flow (Yes at Step S212), the changing unit 303 selects one external port for outputting the data packet, from the external ports connected to the other switch devices 20, excluding the congested ports (Step S213). The changing unit 303 then rewrites the information of the external port mapped to the destination MAC address of the data packet to the selected external port in the FDB 310 (Step S214).

The switching processing unit 311 stores the data packet in the output queue 312 corresponding to the transmission port 313 connected to the external port with which the FDB is rewritten (Step S215). The changing unit 303 then reverts the information of the external port to that of before the information is rewritten in the FDB 310 (Step S216), and the determining unit 304 repeats the process at Step S200.

Operation of Controller 40

Figure 12:
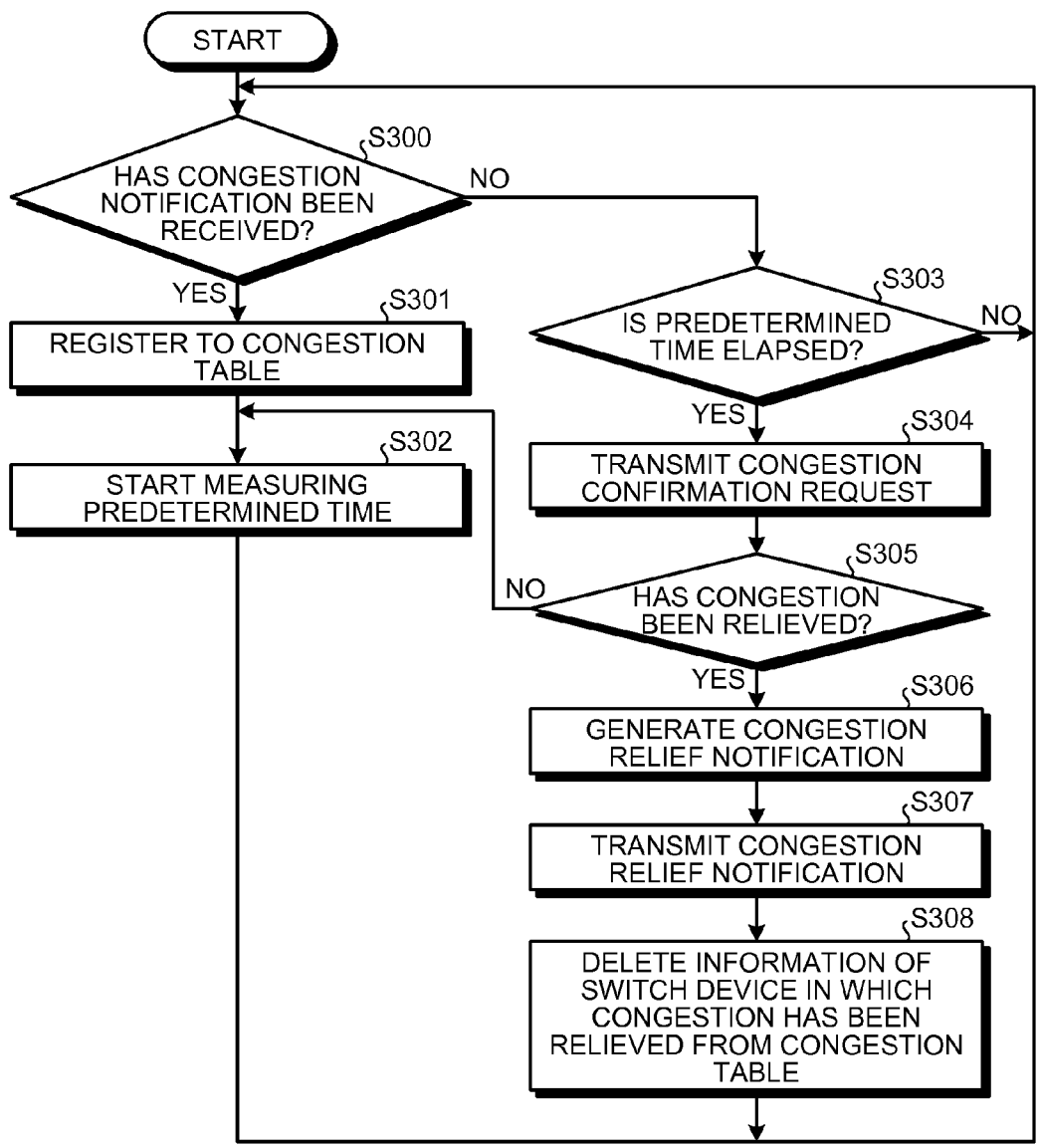
FIG. 12 is a flowchart illustrating an example of an operation of the controller according to the first embodiment.

FIG. 12 is a flowchart illustrating an example of an operation of the controller 40 according to the first embodiment.

To begin with, the registering unit 41 determines whether a congestion notification has been received from a switch device 20 (Step S300). If a congestion notification has been received (Yes at Step S300), the registering unit 41 registers the identification information of the switch device 20, the output queue, and the external port included in the received congestion notification, as well as the time at which the congestion notification is received, in the congestion table 440, in a manner mapped to an Index (Step S301). The confirming unit 42 then starts measuring the predetermined time, e.g., 5 minutes, for each of the Indices in the congestion table 440 (Step S302), and the registering unit 41 repeats the process at Step S300.

If no congestion notification has been received (No at Step S300), the confirming unit 42 determines whether the predetermined time has elapsed for any of the Indices (Step S303). If there is no Index for which the predetermined time has elapsed (No at Step S303), the registering unit 41 repeats the process at Step S300.

If there is any Index for which the predetermined time has elapsed (Yes at Step S303), the confirming unit 42 generates a congestion confirmation request containing information of the Index for which the predetermined time has elapsed, and information of the output queue mapped to the Index. The confirming unit 42 then transmits the generated congestion confirmation request to the switch device 20 corresponding to the SW_ID mapped to the Index for which the predetermined time has elapsed (Step S304).

The confirming unit 42 then determines whether the congestion has relieved, by receiving the congestion confirmation response from the switch device 20 and determining whether the received congestion confirmation response includes the information indicating a relief of congestion (Step S305). If the congestion has not been relieved yet (No at Step S305), the confirming unit 42 starts measuring the predetermined time again for the Index for which the predetermined time has elapsed (Step S302).

If the congestion has been relieved (Yes at Step S305), the confirming unit 42 sends the Index included in the received congestion confirmation response to the notifying unit 43. The notifying unit 43 refers to the congestion table 440 in the retaining unit 44, and extracts the SW_ID and the information of the external port mapped to the Index received from the confirming unit 42. The notifying unit 43 identifies the address of the switch device 30 that is connected to the extracted external port, and the information of the external port.

The notifying unit 43 then generates a congestion relief notification including the information of the identified external port (Step S306). The notifying unit 43 then transmits the generated congestion relief notification to the switch device 30 having the identified address (Step S307). The notifying unit 43 then deletes the time of occurrence, the SW_ID, the output queue, and the information of the external port mapped to the Index received from the confirming unit 42, and the Index from the congestion table 440 (Step S308), and the registering unit 41 repeats the process at Step S300.

Data Packet Forwarding

Figure 13:
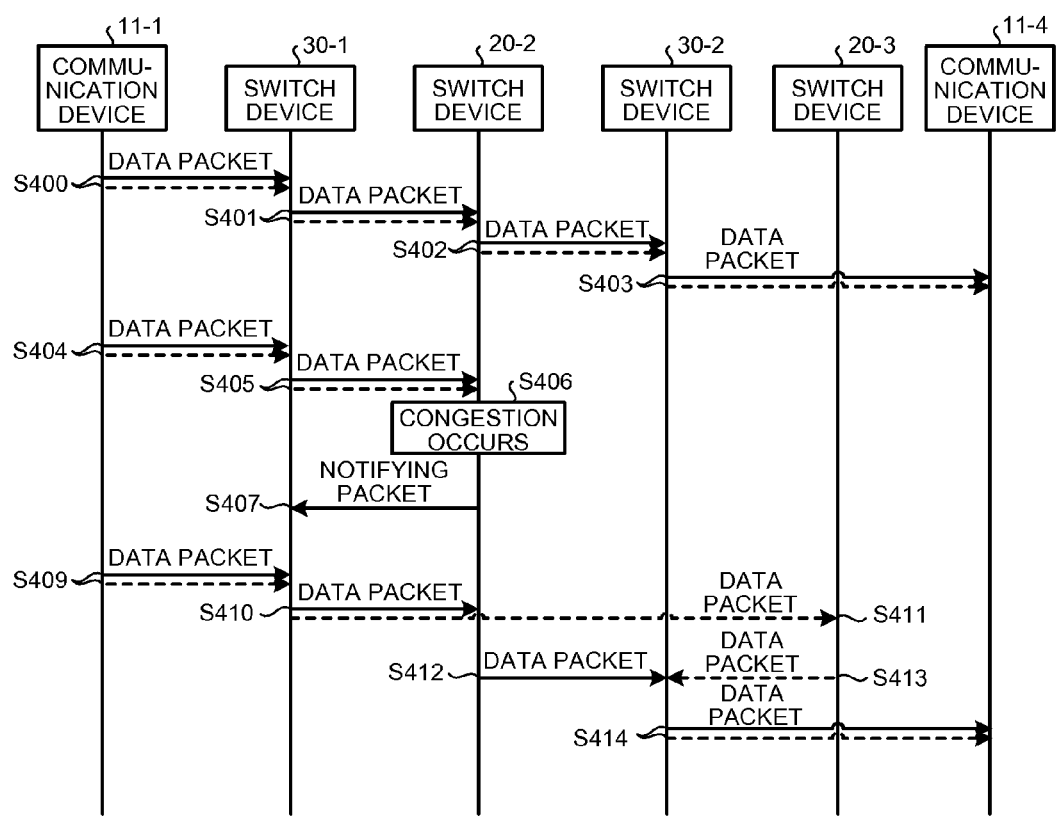
FIG. 13 is a schematic illustrating an example how data packets are forwarded in the first embodiment.

FIG. 13 is a schematic illustrating an example how data packets are forwarded in the first embodiment. Illustrated in FIG. 13 is an example how data packets are forwarded when the data packets are transmitted from the communication device 11-1 to the communication device 11-4 in the information processing system 1 illustrated in FIG. 1. In FIG. 13, the arrows in a solid line represent forwarding of a data packet included in an elephant flow, and the arrows in a dotted line represent forwarding of the data packets included in a mouse flow.

To begin with, the communication device 11-1 transmits the data packets included in an elephant flow and the data packets included in a mouse flow to the switch device 30-1 (Step S400). In the switch device 30-1, the receiving buffer 309 receives the data packets included in the respective flows. The calculating unit 300 calculates the cumulative Flow_Count for each of the flows, and the setting unit 301 sets "1" to the E-flag when the Flow_Count becomes equal to or more than the predetermined threshold. In the switch device 30-1, the switching processing unit 311 refers to the FDB 310, and stores the data packets received by the receiving buffer 309 in the output queue 312 corresponding to the external port based on the respective destinations. The data packets stored in the output queue 312 are transmitted to the switch device 20-2 connected to the corresponding external port (Step S401).

In the switch device 20-2 as well, the receiving buffer 209 receives the data packets included in the respective flows, and the calculating unit 200 calculates the cumulative Flow_Count for each of the flows, and the setting unit 201 sets "1" to the E-flag when the Flow_Count becomes equal to or more than the predetermined threshold. In the switch device 20-2, the switching processing unit 211 refers to the FDB 210, and stores the data packets received by the receiving buffer 209 in the output queue 212 corresponding to the external port based on the respective destinations. The data packets stored in the output queue 212 is transmitted to the switch device 30-2 connected to the corresponding external port (Step S402).

In the switch device 30-2 as well, the same process at Step S401 is performed to the data packets received from the switch device 20-2, and the data packets are transmitted to the communication device 11-4 (Step S403). The communication device 11-4 receiving the data packets returns respective acknowledgements (ACKs), but the ACKs are omitted in FIG. 13.

In the same manner, the data packets are transmitted from the communication device 11-1 to the switch device 30-1 (Step S404), and the switch device 30-1 forwards the data packets to the switch device 20-2 (Step S405). In the switch device 20-2, when congestion occurs in the output queue 212 corresponding to the external port connected to the switch device 30-2 (Step S406), the switch device 20-2 transmits a notifying packet to the switch device 30-1. The switch device 30-1 then retains the external port at which the notifying packet is received as a congested port.

When data packets are then transmitted from the communication device 11-1 to the switch device 30-1 (Step S409), the switch device 30-1 stores the data packet included in the mouse flow in the output queue 212 corresponding to an external port other than the congested port. This process causes the data packet included in the mouse flow to be transmitted to the switch device 20-3 via the external port connected to the switch device 20-3, for example, other than the switch device 20-2 (Step S411).

The data packet included in the mouse flow is transmitted from the switch device 20-3 to the communication device 11-4 via the switch device 30-2 (Step S413, Step S414). In this manner, in the switch device 20-2, the amount of data stored in the output queue 212 corresponding to the external port connected to the switch device 30-2 can be reduced, so that the congestion in the switch device 20-2 can be resolved quickly.

The switch device 30-1 does not change the path for the data packet included in the elephant flow, and stores the data packet in the output queue 212 corresponding to the external port connected to the switch device 20-2. This process allows the data packet included in the elephant flow to be transmitted to the switch device 20-2 via the external port of the switch device 30-1 connected to the switch device 20-2 (Step S410). The data packet is then transmitted from the switch device 20-2 to the communication device 11-4 via the switch device 30-2 (Step S412, Step S414).

Because the transmission path of the data packet included in the elephant flow is not changed, a delay or the like resulting from changing the path is not introduced, so that the throughput of the elephant flow is maintained. For the data packets included in a mouse flow, because the path is changed, the amount of data stored in the output queue 212 corresponding to the external port connected to the switch device 30-2 in the switch device 20-2 is reduced for the amount corresponding to the data packets included in the mouse flow. Therefore, the congestion in the switch device 20-2 can be resolved quickly without changing the path of the data packets included in the elephant flow. A mouse flow includes data packets with a smaller amount of data that are sent more frequently, compared with an elephant flow. Therefore, by controlling the data packet included in the mouse flow not to enter the congested output queue 212, the amount of data in the output queue 212 can be reduced greatly.

It is also possible to allow the corresponding switch device 20 to notify the SDN controller of the congestion when congestion occurs, and to acquire configuration information of a not-congested path from the SDN controller. In such a configuration, however, it takes several seconds or so for the setting of the information of the not-congested path to be completed in the corresponding switch device 20 from when the congestion has occurred. For a mouse flow of which each data packet has an amount of data less than 1 megabyte, for example, several-hundreds of data packets will be lost on a link with a transfer rate of 1 gigabit per second. Assuming that congestion persists for 5 seconds in a line having a transfer rate of 1 gigabit per second, and that each data packet has a size of 500 kilobytes, for example, 250 data packets will be lost before the congestion is resolved. When the data packets are lost, retransmissions occur and the throughput is reduced.

The switch device 20 according to the embodiment transmits a notifying packet for notifying that congestion has occurred to the switch device 30, and the switch device 30 is caused to change the path of the data packet included in a mouse flow, without making an inquiry to the SDN controller. In this manner, less data packets included in a mouse flow are lost in congestion, and a reduction in the throughput for the data packet included in a mouse flow can be suppressed. Because the corresponding switch device 30 is responsible for transmission of a notifying packet and changing the path of the mouse flow without inquiring the SDN controller, the technologies according to the embodiment can also be used in the switch devices 20 and 30 that do not support the SDN.

Advantageous Effects

As described above, the switch device 20 sends a notifying packet for notifying that congestion has occurred to the corresponding switch device 30 when the amount of data in any one of the output queues 212 becomes equal to or more than the predetermined threshold. The switch device 30 then changes the path of the data packet included in a mouse flow, among the packets to be transmitted to the switch device 20, to the switch device 20 other than the switch device 20 in which the congestion has occurred. In this manner, reductions in the throughputs of an elephant flow as well as of a mouse flow can be suppressed.

Furthermore, when the amount of data in the output queue 212 becomes equal to or more than the predetermined threshold, the switch device 20 according to the embodiment identifies which data packets are to be stored in the output queue 212 in which the amount of data has become equal to or more than the predetermined threshold, among the data packets received from the switch device 30. The switch device 20 then identifies the data packet included in a mouse flow from the identified data packets, and changes the queue where the identified data packet is stored to an output queue 212 other than the output queue 212 in which the amount of data has become equal to or more than the predetermined threshold. In this manner, it become possible to control so that the data packet included in a mouse flow transmitted by a switch device 30 not having received the notifying packet can be stored in an output queue 212 other than the output queue 212 in which the amount of data has become equal to or more than the predetermined threshold. Therefore, the congestion can be resolved more quickly.

Furthermore, the switch device 20 according to the embodiment identifies the data packets included in a mouse flow from those stored in the output queue 212 in which the amount of data becomes equal to or more than the predetermined threshold. The switch device 20 then transmits a notifying packet for notifying that congestion has occurred to the switch device 30 from which the identified data packets have been transmitted. In this manner, an increase of traffic due to the transmission of the notifying packet can be minimized.

Furthermore, in the embodiment, each of the switch devices 20 and the switch devices 30 calculates the cumulative amount of data in the received data packets for each of the flows, and distinguishes the data packets included in an elephant flow from the data packet included in a mouse flow. In this manner, the data packet included in an elephant flow and the data packet included in a mouse flow can be distinguished quickly, as each of the flows are generated.

In the embodiment described above, the transmitting unit 206 is explained to transmit the notifying packet to the switch device 30 that is the transmitter of the data packets stored in the output queue 212 in which the amount of data becomes equal to or more than the predetermined threshold, but the technologies according to the application is not limited thereto. As another example, the transmitting unit 206 may transmit the notifying packet to all of the external ports to which the lower-level switch devices 30 are connected.

[b] Second Embodiment

Figure 14:
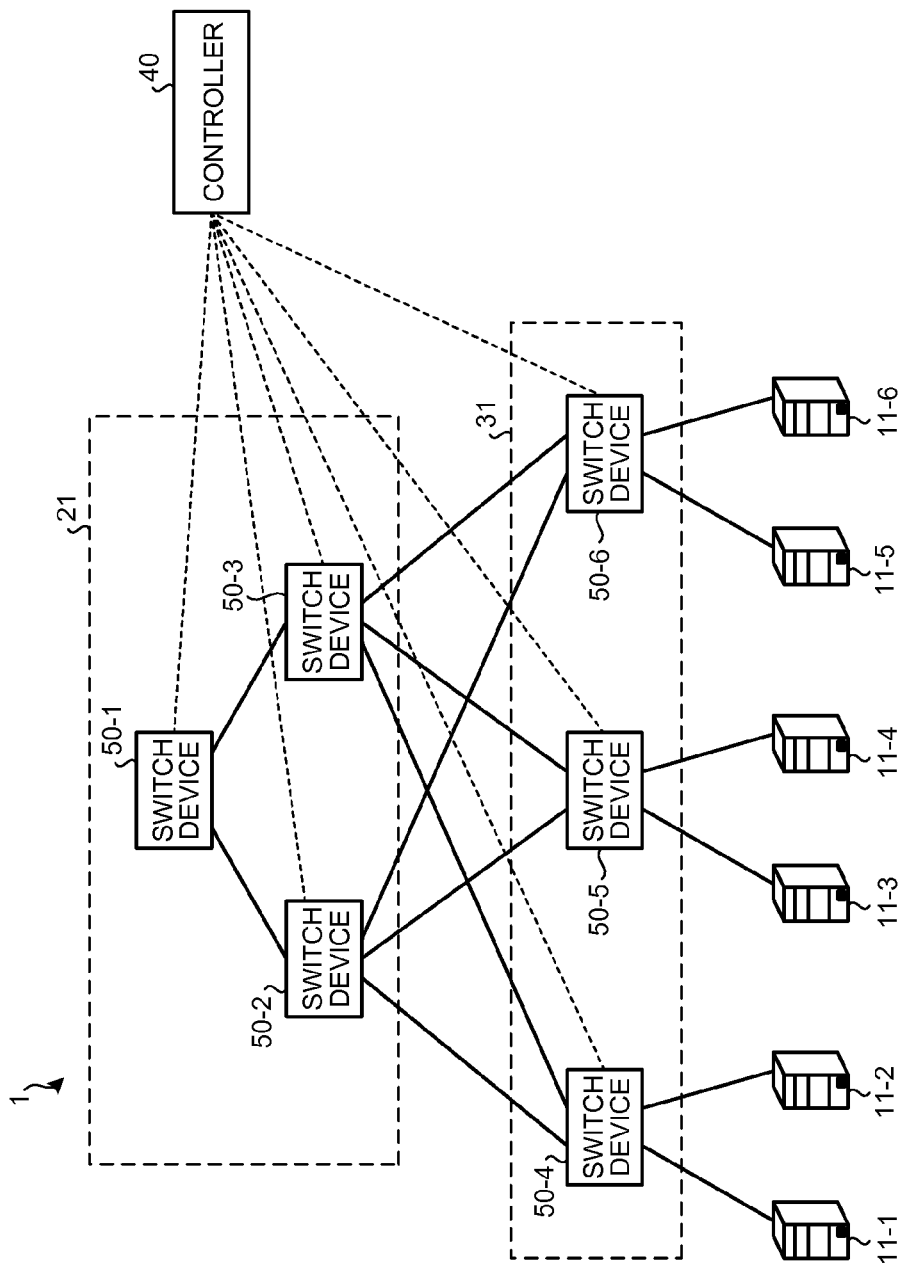
FIG. 14 is a schematic illustrating an example of an information processing system according to a second embodiment.

FIG. 14 is a schematic illustrating an example of an information processing system 1 according to a second embodiment of the application. The information processing system 1 according to this embodiment includes, for example, a plurality of switch devices 50-1 to 50-6, a plurality of communication devices 11-1 to 11-6, and a controller 40, as illustrated in FIG. 14. Hereinafter, the switch devices 50-1 to 50-6 are generally referred to as switch devices 50 when each of the switch devices 50-1 to 50-6 is not distinguished from one another. The information processing system 1 according to this embodiment is different from that according to the first embodiment in having the switch devices 50 instead of the switch devices 20 and the switch devices 30.

Block Diagram of Switch Device 50

Figure 15:
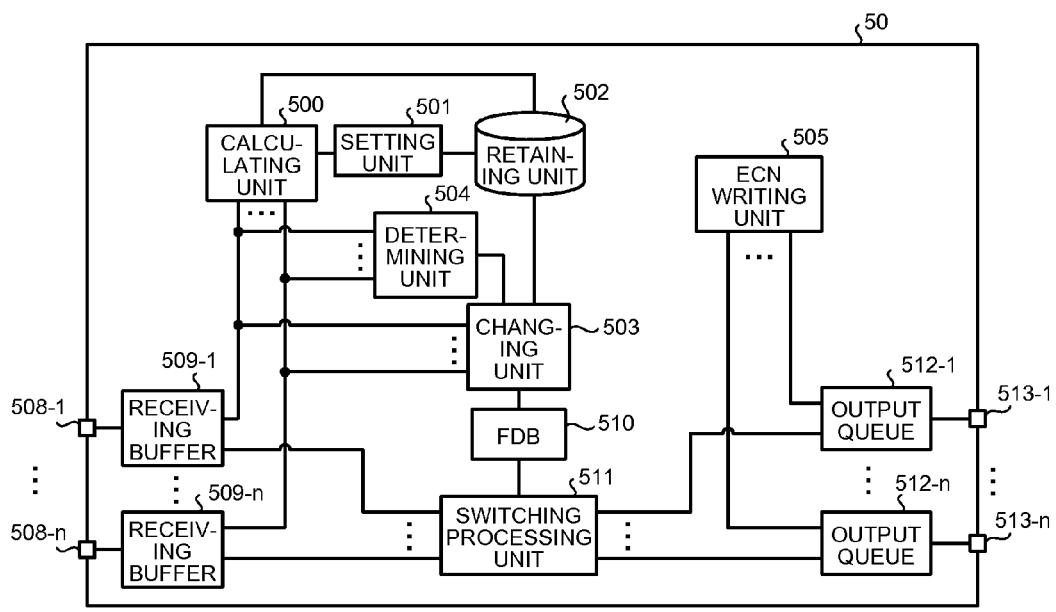
FIG. 15 is a block diagram illustrating an example of a switch device according to the second embodiment.

FIG. 15 is a block diagram illustrating an example of a switch device 50 according to the second embodiment. The switch device 50 according to this embodiment includes a calculating unit 500, a setting unit 501, a retaining unit 502, a changing unit 503, a determining unit 504, and an explicit congestion notification (ECN) writing unit 505. The switch device 50 also includes a plurality of receiving ports 508-1 to 508-n, a plurality of receiving buffers 509-1 to 509-n, an FDB 510, a switching processing unit 511, a plurality of output queues 512-1 to 512-n, and a plurality of transmission ports 513-1 to 513-n.

Hereinafter, the receiving ports 508-1 to 508-n are generally referred to as receiving ports 508 when each of the receiving ports 508-1 to 508-n is not distinguished from one another, and the receiving buffers 509-1 to 509-n are generally referred to as receiving buffers 509 when each of the receiving buffers 509-1 to 509-n is not distinguished from one another. The output queues 512-1 to 512-n are generally referred to as output queues 512 when each of the output queues 512-1 to 512-n is not distinguished from one another, and the transmission ports 513-1 to 513-n are generally referred to as transmission ports 513 when each of the transmission ports 513-1 to 513-n is not distinguished from one another.

The functions of the calculating unit 500, the setting unit 501, the retaining unit 502, the receiving ports 508, and the receiving buffers 509 are the same as those of the calculating unit 300, the setting unit 301, the retaining unit 302, the receiving ports 308, and the receiving buffer 509 explained with reference to FIG. 5, so that detailed explanations thereof are omitted herein. The functions of the FDB 510, the switching processing unit 511, the output queue 512, and the transmission port 513 are the same as those of the FDB 310, the switching processing unit 311, the output queue 312, and the transmission port 313 explained with reference to FIG. 5, so that detailed explanations thereof are omitted herein.

The ECN writing unit 505 monitors the amount of data in each of the output queues 512. When the amount of data becomes equal to or more than a predetermined threshold, the ECN writing unit 505 writes "11" to the ECN flag in the internet protocol (IP) header of the data packets in the output queue 512. The predetermined threshold is 65 packets, for example, when the transmission rate of the transmission port 513 is 10 gigabits per second, for example.

Figure 16:
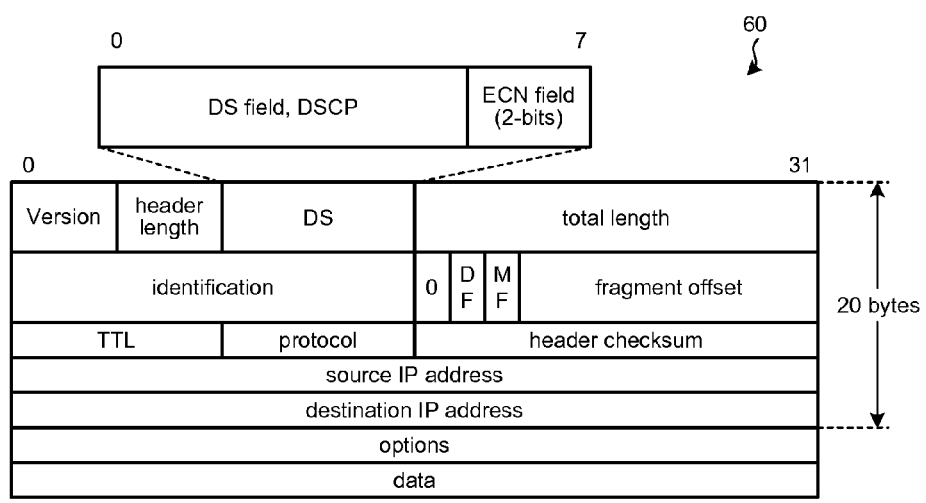
FIG. 16 is a schematic for explaining the bit position of an ECN flag.

FIG. 16 is a schematic for explaining the bit position of the ECN flag. The ECN flag is assigned to the two least significant bits of the Differentiated Services (DS) field of the header in an IP packet 60. In the ECN flag, "00" represents that congestion detection is not supported, "10" or "01" represents that congestion can be detected but congestion is not currently detected, and "11" represents that congestion can be detected and congestion is currently detected.

Figure 17:
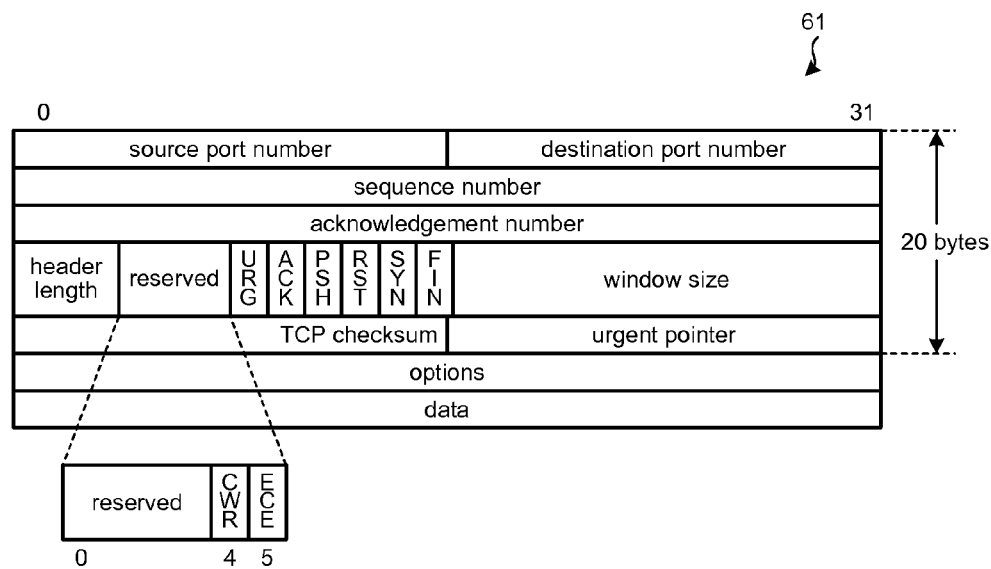
FIG. 17 is a schematic for explaining the bit position of an ECE flag.

The determining unit 504 monitors the data packets received by each of the receiving buffers 509, and determines whether the ECN-Echo (ECE) flag in the TCP header of each of the data packets received by the receiving buffers 509 is "1". FIG. 17 is a schematic for explaining the bit position of the ECE flag. The ECE flag is assigned to one bit of the header (e.g., the least significant bit of the 6-bit Reserved field) of a TCP packet 61. "0" set to the ECE flag represents no congestion, and "1" represents congested. To the second bit next to the least significant bit of the Reserved field, Congestion Window Reduced (CWR) flag is assigned. "0" set to the CWR flag represents that congestion window is not reduced, and "1" represents that the congestion window is reduced.

When the ECE flag of the data packet received by the receiving buffer 509 is "1", the determining unit 504 identifies the external port corresponding to the receiving buffer 509 at which the data packet with the ECE flag set to "1" is received. The determining unit 504 then sends the information of the identified external port to the changing unit 503. The data packet with the ECE flag set to "1" is an example of a notifying packet for notifying that congestion has occurred.

When the information of the external port is received from the determining unit 504, the changing unit 503 retains the external port specified in the received information as a congested port. When another congested port is already retained, the changing unit 503 adds the external port received from the determining unit 504 as a congested port. Every time the receiving buffer 509 receives a data packet, the changing unit 503 identifies the external port from which the data packet is to be transmitted, by referring to the FDB 510 based on the destination MAC address of the data packet. The changing unit 503 then determines whether the identified external port matches any one of the ports retained as the congested ports.

If the identified external port matches any one of the ports retained as the congested ports, the changing unit 503 identifies the Flow_ID of the flow including the data packet by referring to the flow table in the retaining unit 502 based on the header information of the data packet. The changing unit 503 then determines whether the E-flag mapped to the identified Flow_ID is "0", that is, if the flow corresponding to the identified Flow_ID is a mouse flow. If the E-flag is "0", the changing unit 503 selects one of the external ports, excluding the congested ports, from the external ports connected to the other switch devices 50.

The changing unit 503 then causes the switching processing unit 511 to change the output queue in which the data packet is to be stored by rewriting the information of the external port mapped to the destination MAC address of the data packet to the selected external port in the FDB 510. The switching processing unit 511 then stores the data packets in the output queue 512 corresponding to the transmission port 513 connected to the external port with which the FDB is rewritten. When the switching processing unit 511 stores the data packet in the output queue 512 corresponding to the transmission port 513 connected to the external port with which the FDB is rewritten, the changing unit 503 reverts the information of the external port to that of before the information is rewritten in the FDB 510.

Block Diagram of Communication Device 11

Figure 18:
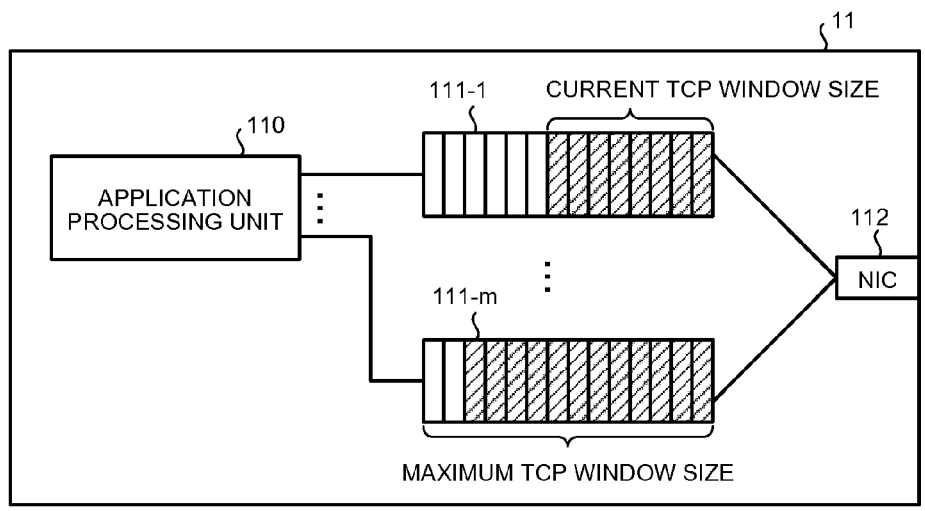
FIG. 18 is a block diagram illustrating an example of a communication device according to the second embodiment.

FIG. 18 is a block diagram illustrating an example of the communication device 11 according to the second embodiment. The communication device 11 includes an application processing unit 110, a plurality of TCP socket buffers 111-1 to 111-$m$, and a network interface card (NIC) 112. The TCP socket buffers 111-1 to 111-$m$ are provided for respective sockets, for example. The application processing unit 110 reduces the current TCP window size that is the size of the congestion window to a half, for example, in the corresponding TCP socket buffer 111 when an acknowledgement (ACK) packet with the ECE flag set to "1" is received as a response to a data packet having transmitted. The application processing unit 110 writes "1" to the CWR flag of the data packet in the TCP socket buffer 111 in which the TCP window size is reduced.

Data Packet Forwarding

Figure 19:
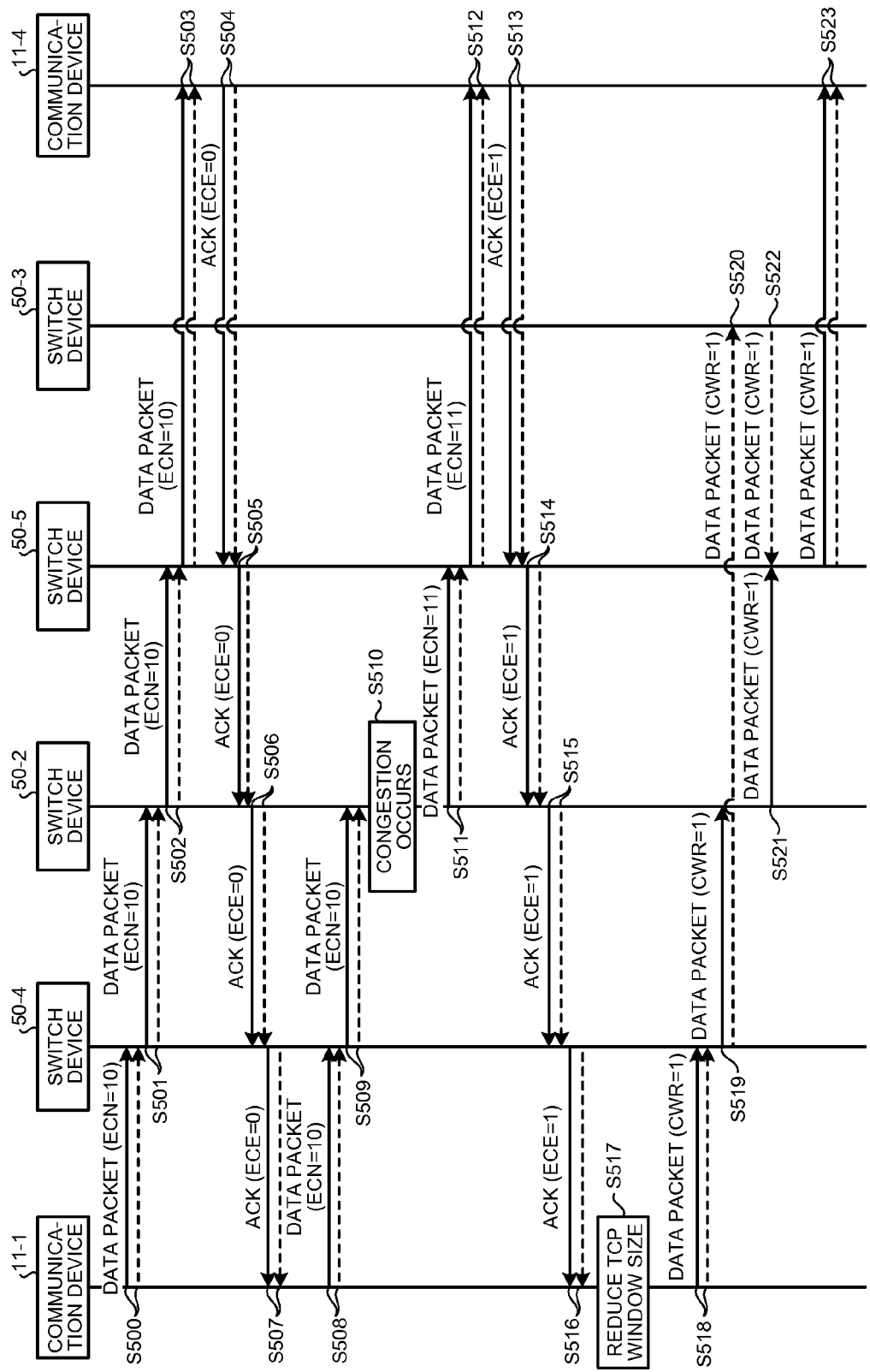
FIG. 19 is a schematic illustrating an example how data packets are forwarded in the second embodiment.

FIG. 19 is a schematic illustrating an example how data packets are forwarded in the second embodiment. Illustrated in FIG. 19 is an example how data packets are forwarded when the data packets are transmitted from the communication device 11-1 to the communication device 11-4 in the information processing system 1 illustrated in FIG. 14. In FIG. 19, the arrows in a solid line represent forwarding of a data packet included in an elephant flow, and the arrows in a dotted line represents forwarding of the data packets included in a mouse flow.

To begin with, the communication device 11-1 sets "10" to the ECN flag in the data packet included in the elephant flow and to that in the data packet included in the mouse flow, and transmits the data packets to the switch device 50-4 (Step S500). Because the switch device 50-4 is not congested, the switch device 50-4 transmits the data packets to the switch device 50-2 based on the respective destinations, without rewriting the ECN flag (Step S501). Because the switch device 50-2 is also not congested, the switch device 50-2 transmits the data packets to the switch device 50-5 based on the respective destinations without rewriting the ECN flag (Step S502). Because the switch device 50-5 is also not congested, the switch device 50-5 transmits the data packets to the communication device 11-4 based on the respective destinations without rewriting the ECN flag (Step S503).

In each of the switch devices 50-2 to 50-4 and 50-5, the receiving buffers 509 receive the data packets included in the respective flows, and the calculating unit 500 calculates the cumulative Flow_Count for each of the flows. When the Flow_Count becomes equal to or more than the predetermined threshold, the setting unit 501 then sets "1" to the E-flag. The switching processing unit 511 refers to the FDB 510, and stores the data packets received by the receiving buffer 509 in the output queue 512 corresponding to the external port based on the respective destinations. The data packets stored in the output queue 512 are transmitted to the switch device 50 connected to the corresponding external port.

Because the ECN flag in the received data packet is "10", the communication device 11-4 transmits the ACK packet with the ECE flag set to "0" to the switch device 50-5 (Step S504). The ACK packet transmitted by the communication device 11-4 is transmitted to the communication device 11-1 via the switch device 50-5, the switch device 50-2, and the switch device 50-4 (Step S505 to Step S507).

The communication device 11-1 then transmits additional data packets corresponding to the respective data flows (Step S508, S509). When congestion occurs in the switch device 50-2 (Step S510), the ECN writing unit 505 in the switch device 50-2 rewrites the ECN flag in each of the data packets in the output queue in which the amount of data has become equal to or more than the predetermined amount to "11". This process causes the switch device 50-2 to transmit the data packets of which ECN flag is set to "11" to the switch device 50-5 (Step S511). Because the switch device 50-5 is not congested, the switch device 50-5 transmits the data packets to the communication device 11-4 based on the respective destinations without rewriting the ECN flag (Step S512).

Because the ECN flag in the received data packet is "11", the communication device 11-4 transmits the ACK packet with the ECE flag set to "1" to the switch device 50-5 (Step S513). The ACK packet transmitted by the communication device 11-4 is transmitted to the communication device 11-1 via the switch device 50-5, the switch device 50-2, and the switch device 50-4 (Step S514 to Step S516).

In each of the switch devices 50-2 to 50-4 and 50-5, the determining unit 504 identifies the external port corresponding to the receiving buffer 509 at which data packet with the ECE flag set to "1" is received, and sends the information of the identified external port to the changing unit 503. When the information of the external port is received from the determining unit 504, the changing unit 503 retains the external port specified in the received information as a congested port. For example, the changing unit 503 in the switch device 50-4 retains the external port connected to the switch device 50-2 as a congested port.

Because the ACK packet with the ECE flag set to "1" is received, the communication device 11-1 reduces the current size of the TCP window to a half, for example, in the TCP socket buffer 111 in which the data packets corresponding to the ACK packet are stored (Step S517). The data packets with the CWR flag set to "1" are then transmitted to the switch device 50-4 (Step S518).

In the switch device 50-4, because the external port connected to the switch device 50-2 is retained as a congested port, the switch device 50-4 stores the data packet included in the mouse flow in the output queue 512 corresponding to an external port other than the congested port. This process causes the data packet included in the mouse flow to be transmitted to the switch device 50-3 via the external port connected to the switch device 50-3, for example, other than the switch device 50-2 (Step S520).

The data packet included in the mouse flow is then transmitted from the switch device 50-3 to the communication device 11-4 via the switch device 50-5 (Step S522, Step S523). In this manner, in the switch device 50-2, the amount of data stored in the output queue 512 corresponding to the external port connected to the switch device 50-5 can be reduced, so that the congestion in the switch device 50-2 can be resolved quickly.

Furthermore, the switch device 50-4 stores the data packet included in the elephant flow in the output queue 512 corresponding to the external port connected to the switch device 50-2, without changing the path. This process allows the data packet included in the elephant flow to be transmitted from the external port connected to the switch device 50-2 to the switch device 50-2 (Step S519). The data packet included in the elephant flow is transmitted from the switch device 50-2 to the communication device 11-4 via the switch device 50-5 (Step S521, Step S523).

Advantageous Effects

As described above, when a data packet with the ECE flag set to "1" is received, the switch device 50 according to the embodiment transmits the data packet included in a mouse flow from an external port other than the external port at which the data packet with the ECE flag set to "1" is received. In this manner, a reduction in the throughput of the elephant flow can be suppressed, and the mouse flow can be handled efficiently.

[c] Third Embodiment

In the first and the second embodiments, each of the switch devices calculates the cumulative amount of data in the received data packets for each of the flows, and distinguishes the data packets included in an elephant flow from those of a mouse flow. By contrast, a third embodiment is different from the first and the second embodiments in that the source communication device 11 distinguishes the data packets included in an elephant flow and the data packets included in a mouse flow, before transmitting the data packets.

Block Diagram of Communication Device 11

Figure 20:
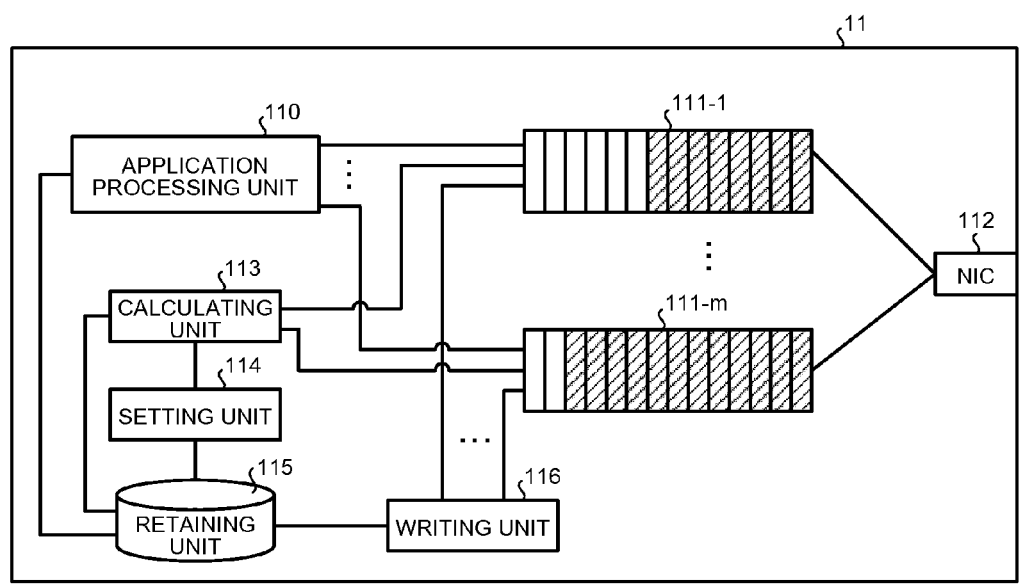
FIG. 20 is a block diagram illustrating an example of a communication device according to a third embodiment.

FIG. 20 is a block diagram illustrating an example of the communication device 11 according to the third embodiment. The communication device 11 according to the embodiment includes the application processing unit 110, the TCP socket buffers 111-1 to 111-m, the NIC 112, a calculating unit 113, a setting unit 114, a retaining unit 115, and a writing unit 116. Except for the points described below, the components given the same reference numerals in FIG. 20 as those in the FIG. 18 have the same or similar functions as those in the FIG. 18, so that the explanations thereof are omitted herein.

The retaining unit 115 retains a flow table that is the same as the flow table 2020 explained with reference to FIG. 3, for example. When a data packet is stored in the TCP socket buffer 111, the calculating unit 113 identifies the Flow_ID of the flow including the data packet based on the match fields in the flow table in the retaining unit 115 and the header information of the data packet. The calculating unit 113 then identifies the Flow_Count mapped to the identified Flow_ID in the flow table.

The calculating unit 113 then updates the Flow_Count by adding the amount of data in the data packet stored in the TCP socket buffer 111 to the identified Flow_Count. The setting unit 114 monitors the Flow_Count in the flow table, and sets "1" to the corresponding E-flag when the Flow_Count becomes equal to or more than the predetermined threshold.

When a data packet is stored in the TCP socket buffer 111, the writing unit 116 identifies the Flow_ID of the flow including the data packet based on the match fields in the flow table in the retaining unit 115 and the header information of the data packet. The writing unit 116 extracts the value specified in the E-flag mapped to the identified Flow_ID.

If the extracted E-flag value is "0", the writing unit 116 writes a specific value to the Differentiated Services Code Point (DSCP) field in the header of the data packet stored in the TCP socket buffer 111. The specific value is a value indicating that the data packet is included in a mouse flow, and is "000000", for example. The DSCP field is assigned to the six most significant bits of the DS field illustrated in FIG. 16. If the extracted E-flag value is "1", the writing unit 116 writes a specific value to the DSCP field in the header of the data packet stored in the TCP socket buffer 111. The specific value is a value indicating that the data packet is included in an elephant flow, and is "000011", for example.

In this embodiment, the setting unit 114 determines whether a flow is a mouse flow or an elephant flow based on whether the cumulative amount of data included in the flow is equal to or more than the predetermined threshold, but the determination scheme is not limited thereto. For example, the setting unit 114 may measure the amount of data in each of the TCP socket buffers 111 at a predetermined time interval, e.g., 1 second, for each of the flows. The setting unit 114 may then determine that a flow is an elephant flow when the amount of data measured at the predetermined time interval becomes equal to or more than the predetermined threshold, e.g., 100 kilobytes.

Block Diagram of Switch Device 20

Figure 21:
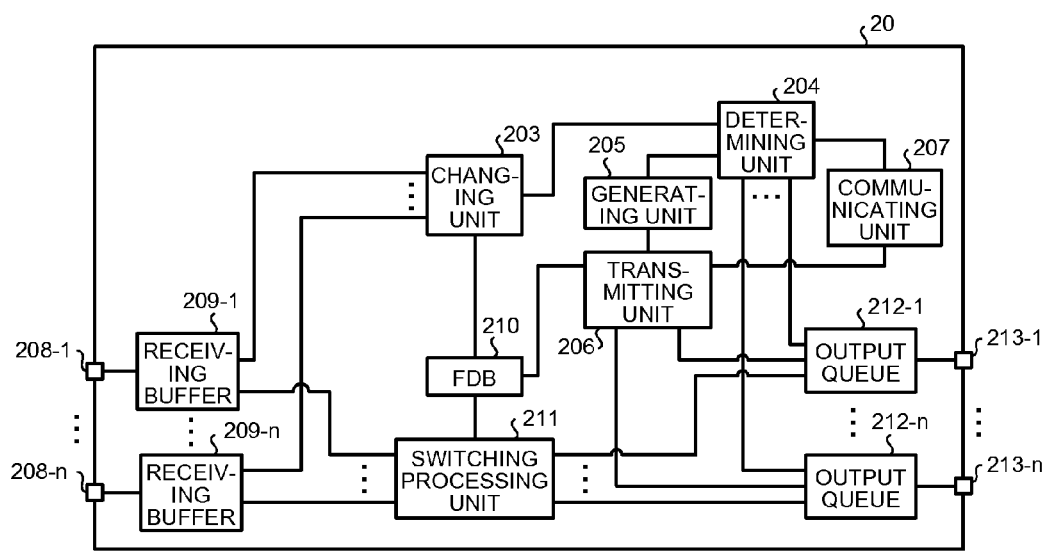
FIG. 21 is a block diagram illustrating an example of an upper-level switch device according to the third embodiment.

FIG. 21 is a block diagram illustrating an example of the upper-level switch device 20 according to the third embodiment. The switch device 20 includes the changing unit 203, the determining unit 204, the generating unit 205, the transmitting unit 206, and the communicating unit 207. The switch device 20 also includes the receiving ports 208-1 to 208-n, the receiving buffers 209-1 to 209-n, the FDB 210, the switching processing unit 211, the output queues 212-1 to 212-n, and the transmission ports 213-1 to 213-n. Except for the points described below, the components given the same reference numerals in FIG. 21 as those in the FIG. 2 have the same or similar functions as those in the FIG. 2, so that the explanations thereof are omitted herein.

Every time the receiving buffers 209 receive a data packet, the changing unit 203 identifies the external port from which the data packet is to be transmitted by referring to the FDB 210 based on the destination MAC address of the data packet. The changing unit 203 then determines whether the identified external port matches any one of the ports retained as the congested ports.

If the identified external port matches any one of the ports retained as the congested ports, the changing unit 203 determines whether the flow including the data packet is a mouse flow based on the value set to the DSCP in the header of the data packet. The changing unit 203 then determines that the data packet is included in a mouse flow if the DSCP value in the header of the data packet is "000000", for example, and determines that the data packet is included in an elephant flow if the DSCP value is "000011", for example. If the flow including the data packet is a mouse flow, the changing unit 203 selects one of the external ports, excluding the congested ports, from the external ports connected to the other switch devices 20 or 30.

Block Diagram of Switch Device 30

Figure 22:
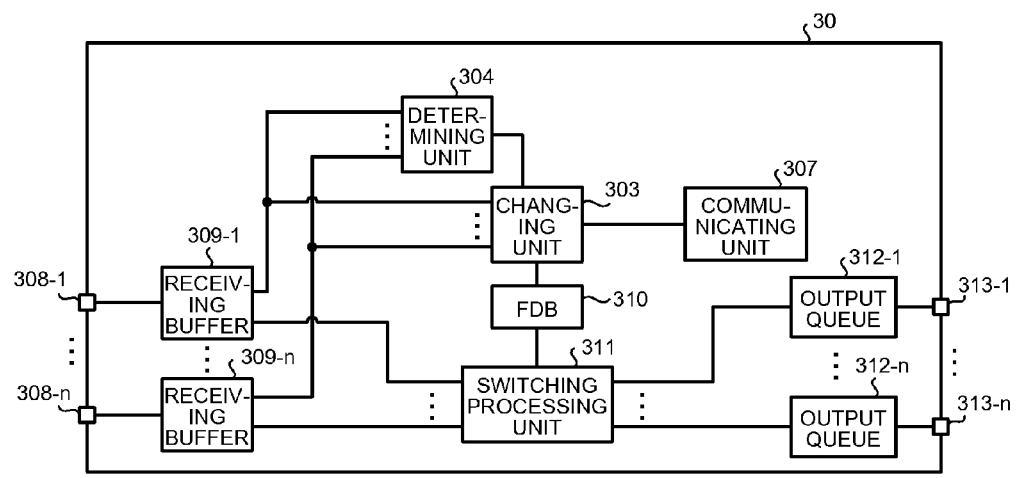
FIG. 22 is a block diagram illustrating an example of a lower-level switch device according to the third embodiment.

FIG. 22 is a block diagram illustrating an example of the lower-level switch device 30 according to the third embodiment. The switch device 30 includes the changing unit 303, the determining unit 304, and the communicating unit 307. The switch device 30 also includes the receiving ports 308-1 to 308-n, the receiving buffers 309-1 to 309-n, the FDB 310, the switching processing unit 311, the output queues 312-1 to 312-n, and the transmission ports 313-1 to 313-n. Except for the points described below, the components given the same reference numerals in FIG. 22 as those in the FIG. 5 have the same or similar functions as those in the FIG. 5, so that the explanations thereof are omitted herein.

Every time the receiving buffers 309 receive a data packet, the changing unit 303 identifies the external port from which the data packet is to be transmitted by referring to the FDB 310, based on the destination MAC address of the data packet. The changing unit 303 then determines whether the identified external port matches any one of the ports retained as the congested ports.

If the identified external port matches any one of the ports retained as the congested ports, the changing unit 303 determines whether the flow including the data packet is a mouse flow based on the value set to the DSCP in the header of the data packet. The changing unit 303 determines that the data packet is included in a mouse flow if the DSCP value in the header of the data packet is "000000", for example, and determines that the data packet is included in an elephant flow if the DSCP value is "000011", for example. If the flow including the data packet is a mouse flow, the changing unit 303 selects one of the external ports, excluding the congested ports, from the external ports connected to the other switch devices 20 or 30.

Operation of Communication Device 11

Figure 23:
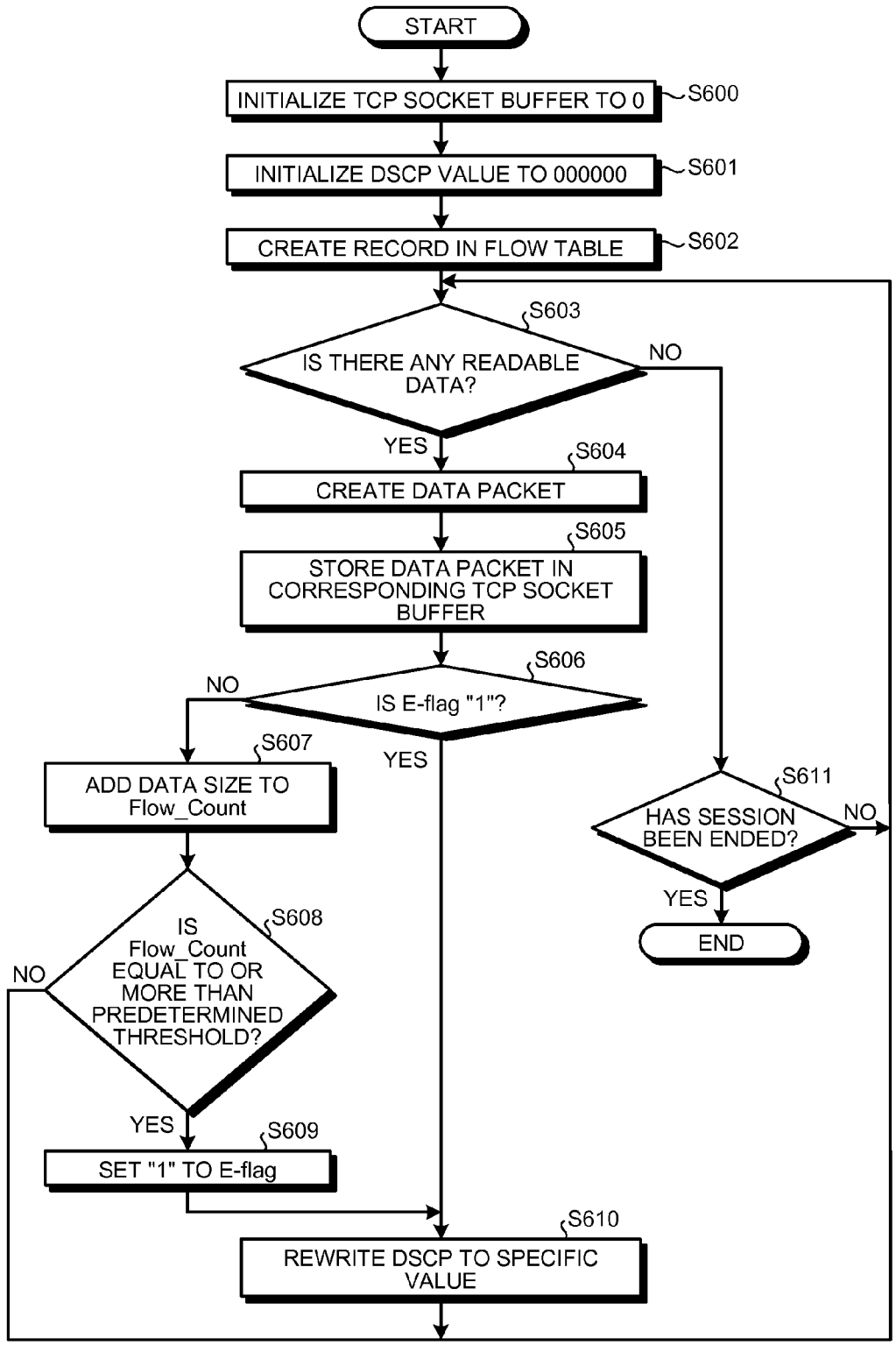
FIG. 23 is a flowchart illustrating an example of an operation of the communication device according to the third embodiment.

FIG. 23 is a flowchart illustrating an example of an operation of the communication device 11 according to the third embodiment. The communication device 11 starts the operation illustrated in this flowchart every time a session is initiated, for example.

To begin with, the application processing unit 110 initializes the TCP socket buffers 111 to zero (Step S600). The application processing unit 110 initializes the DSCP to "000000" (Step S601). The application processing unit 110 then create a record including a Flow_ID, match fields, a Flow_Count, and an E-flag in the flow table in the retaining unit 115 (Step S602). The match fields store therein information for identifying a TCP socket buffer 111, for example. The Flow_Count and the E-flag store therein zero, for example, as an initial value.

The application processing unit 110 then determines whether there is any readable data (Step S603). If there is no readable data (No at Step S603), the application processing unit 110 determines whether the session has been ended (Step S611). If the session has not been ended (No at Step S611), the application processing unit 110 repeats the process at Step S603. If the session has been ended (Yes at Step S611), the communication device 11 ends the process illustrated in this flowchart.

If there is any readable data (Yes at Step S603), the application processing unit 110 reads the data and creates a data packet (Step S604). The application processing unit 110 then stores the created data packet in the corresponding TCP socket buffer 111 initialized at Step S600 (Step S605).

The calculating unit 113 and the writing unit 116 determine whether the E-flag is "1" by referring to the record created at Step S602 (Step S606). If the E-flag is "1" (Yes at Step S606), the writing unit 116 rewrites the DSCP value of the data packet stored in the TCP socket buffer 111 to the specific value, e.g., "000011" (Step S610), and the application processing unit 110 repeats the process at Step S603.

If the E-flag is "0" (No at Step S606), the calculating unit 113 adds the data size of the data packet stored in the TCP socket buffer 111 to the Flow_Count in the record created at Step S602 (Step S607). The setting unit 114 then determines whether the Flow_Count is equal to or more than the predetermined threshold (Step S608).

If Flow_Count is equal to or more than the predetermined threshold (Yes at Step S608), the setting unit 114 sets "1" to the E-flag of the record created at Step S602 (Step S609), and the writing unit 116 executes the process at Step S610. If the Flow_Count is less than the predetermined threshold (No at Step S608), the application processing unit 110 repeats the process at Step S603.

Advantageous Effect

As described above, in the embodiment, the communication device 11 distinguishes the data packets included in an elephant flow and the data packets included in a mouse flow, and writes the respective identification information to the respective data packets. In this manner, the processing load of the switch devices 20 and 30 can be reduced.

[d] Fourth Embodiment

In the first and the second embodiments, each of the switch devices calculates the cumulative amount of data in the received data packets for each of the flows, and distinguishes the data packets included in an elephant flow from the data packet included in a mouse flow. By contrast, a fourth embodiment is different from the first and the second embodiments in that the controller 40 distinguishes the data packets included in an elephant flow and the data packets included in a mouse flow, and notifies each of the switch devices 20 and the switch devices 30. By causing the controller 40 to execute the process of distinguishing the data packets included in an elephant flow and the data packets included in a mouse flow, the processing load of the switch devices can be reduced.

Block Diagram of Controller 40

Figure 24:
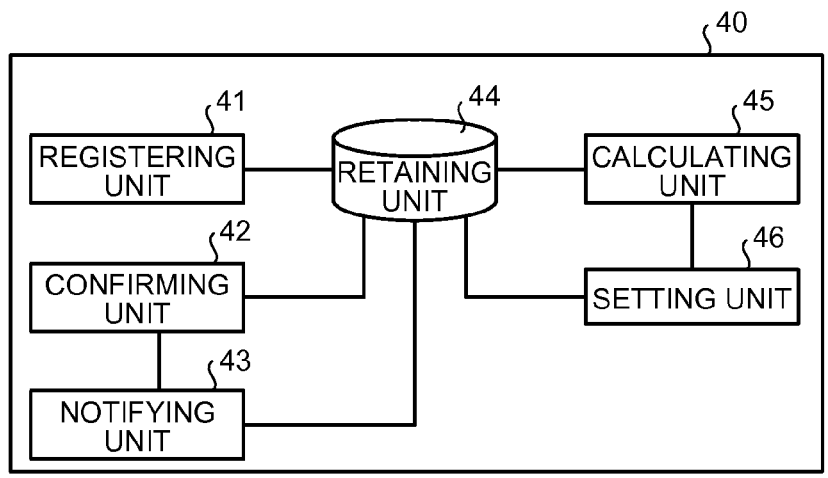
FIG. 24 is a block diagram illustrating an example of a controller according to a fourth embodiment of the present invention.

FIG. 24 is a block diagram illustrating an example of a controller 40 according to the fourth embodiment. The controller 40 includes the registering unit 41, the confirming unit 42, the notifying unit 43, the retaining unit 44, a calculating unit 45, and a setting unit 46. Except for the points described below, the components given the same reference numerals in FIG. 24 as those in the FIG. 7 have the same or similar functions as those in the FIG. 7, so that the explanations thereof are omitted herein.

The retaining unit 44 retains a flow table that is the same as the flow table 2020 explained with reference to FIG. 3, for example. The calculating unit 45 receives information related to the flows, including the amount of data in the data packets passed in the information processing system 1, from application management software (AMS) that manages the data packets passed in the entire information processing system 1. The calculating unit 45 then identifies the Flow_ID of a flow including data packets based on the match fields in the flow table in the retaining unit 44 and the received information related to the flows. The calculating unit 45 identifies the Flow_Count mapped to the identified Flow_ID in the flow table.

The calculating unit 45 then updates the Flow_Count by adding the amount of data in the data packet to the identified Flow_Count. The setting unit 46 monitors the Flow_Count in the flow table, and sets "1" to the E-flag when the Flow_Count becomes equal to or more than the predetermined threshold.

The notifying unit 43 monitors the E-flag of each of the flows in the flow table. When the E-flag changes from "0" to "1", the notifying unit 43 identifies the switch device 20 and the switch device 30 through which the flow with the E-flag having changed from "0" to "1" has passed. The controller 40 retains topology of the information processing system 1, and the notifying unit 43 identifies the switch device 20 and the switch device 30 through which the flow of which E-flag having changed from "0" to "1" has passed by referring to the topology of the information processing system 1, for example. The notifying unit 43 then transmits the information related to the flow with the E-flag having changed from "0" to "1" to the identified switch device 20 and the identified switch device 30.

Figure 25:
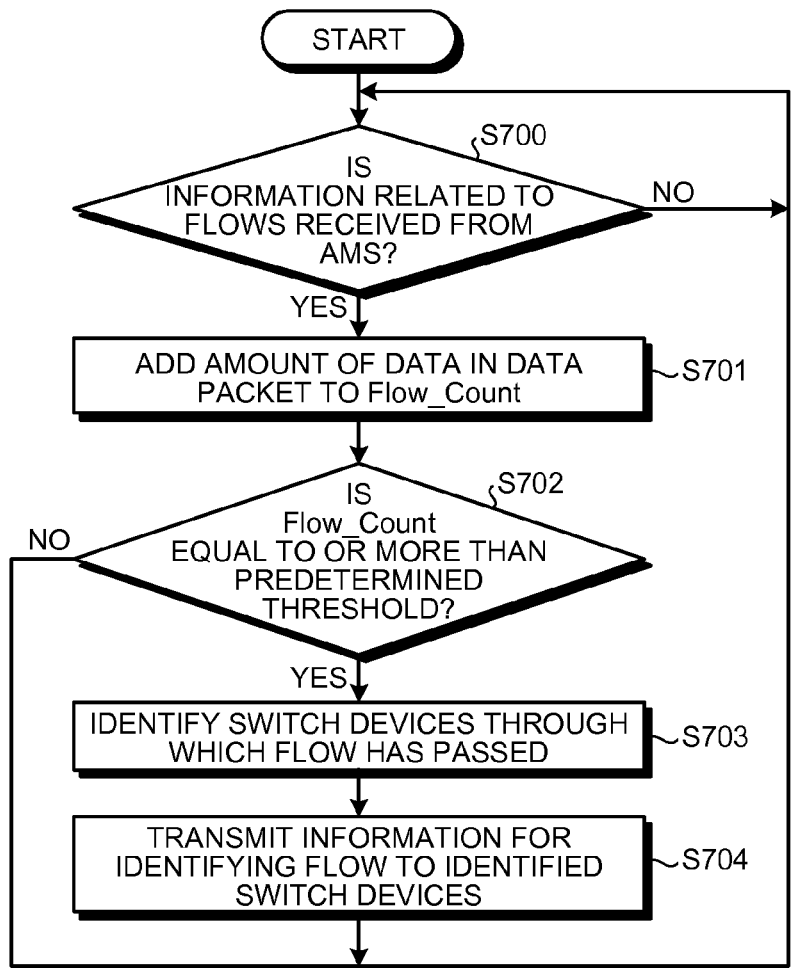
FIG. 25 is a flowchart illustrating an example of an operation of the controller according to the fourth embodiment.

FIG. 25 is a flowchart illustrating an example of an operation of the controller according to the fourth embodiment.

The calculating unit 45 determines whether the information related to the flows including the data packets having passed through the information processing system 1 has been received from the AMS (Step S700). If the information related to the flows has been received from the AMS (Yes at Step S700), the calculating unit 45 identifies the Flow_ID of the flow including the data packet based on the match fields in the flow table in the retaining unit 44 and the received information related to the flows. The calculating unit 45 then identifies the Flow_Count mapped to the identified Flow_ID in the flow table.

The calculating unit 45 then updates the Flow_Count by adding the amount of data in the data packet to the identified Flow_Count (Step S701). The setting unit 46 determines whether the Flow_Count is equal to or more than the predetermined threshold (Step S702). If the Flow_Count is less than the predetermined threshold (No at Step S702), the calculating unit 45 repeats the process at Step S700.

If the Flow_Count is equal to or more than the predetermined threshold (Yes at Step S702), the notifying unit 43 identifies the switch device 20 and the switch device 30 through which the flow with the E-flag having changed from "0" to "1" has passed (Step S703). The notifying unit 43 then transmits the information identifying the flow with the E-flag having changed from "0" to "1" to the identified switch device 20 and the identified switch device 30 (Step S704), and the calculating unit 45 repeats the process at Step S700.

Modifications

The technologies according to the application are not limited to the embodiments described above, and may be modified variously without deviating from the essence of the application.

For example, in the embodiments described above, the path of the data packets included in a mouse flow with a smaller amount of data is changed when congestion occurs, but the technologies according to the application are not limited thereto. For example, each flow may be assigned with a priority at which the throughput is maintained, and the switch device 20 and the switch device 30 may change the path of a flow having a relatively lower priority, and the path of a flow having a relatively higher priority may be maintained when congestion occurs. The priorities of the flows are set in advance by an administrator of the information processing system 1, for example.

In this manner, if a mouse flow with a smaller amount of data has a higher priority at which the throughput is maintained than those of the other flows, the transmission path of the mouse flow is maintained when congestion occurs. Furthermore, when congestion occurs due to a plurality of elephant flows with a large amount of data, because the path for the elephant flows with relatively low priorities at which the throughput is maintained is changed, the congestion can be resolved more quickly.

Furthermore, in the first, the second, the third, and the fourth embodiments described above, the switch device 20 and the switch device 30 are explained to be separate devices, but, as another example, the functions of the switch device 20 and of the switch device 30 may be implemented in one switch device.

Figure 26:
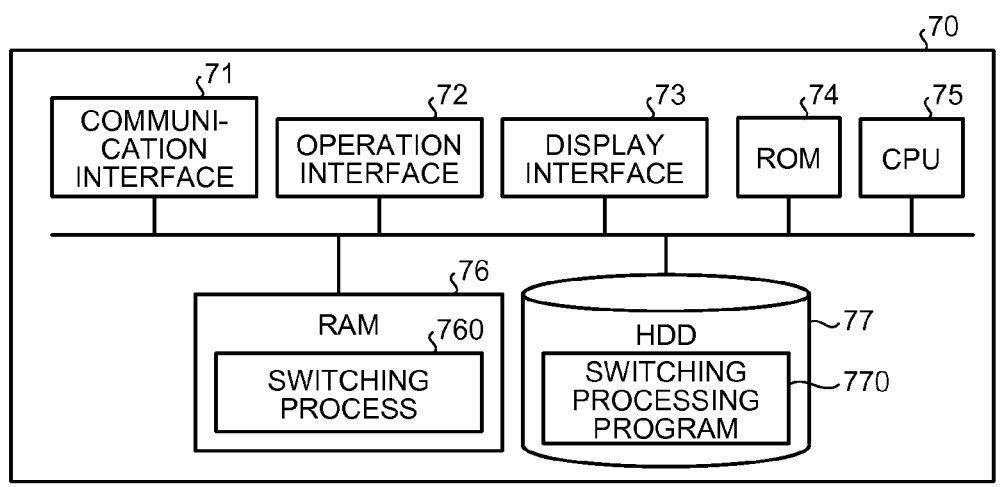
FIG. 26 is a schematic for explaining an example of a computer implementing the functions of the switch device.

The various processes explained in the embodiments described above can be implemented by causing a computer to execute a computer program prepared in advance. Explained now is an example of a computer for executing a computer program having the same functions as those described in the embodiments. FIG. 26 is a schematic illustrating an example of a computer for implementing the functions of the switch devices.

In FIG. 26, this computer 70 for implementing the functions of the switch device includes a communication interface 71, an operation interface 72, a display interface 73, a read only memory (ROM) 74, a central processing unit (CPU) 75, a random-access memory (RAM) 76, and a hard disk drive (HDD) 77.

A switching processing program 770 is stored in the HDD 77 in advance, as illustrated in FIG. 26, for example. The CPU 75 reads the switching processing program 770 from the HDD 77 and loads the program onto the RAM 76. The switching processing program 770 may be integrated or distributed as appropriate in the same manner as the components illustrated in FIG. 1, 9, 15, 21, or 22. Furthermore, all of the data stored in the HDD 77 does not always need to be stored in the HDD 77, and data used for a process may be stored in the HDD 77.

The CPU 75 causes the switching processing program 770 to function as a switching process 760. The switching process 760 loads various types of data read from the HDD 77 onto an area assigned in the RAM 76 as appropriate, and executes various processes based on the various types of loaded data.

The switch device 20 according to the first or the fourth embodiment implements the same functions as those of the calculating unit 200, the setting unit 201, the retaining unit 202, the changing unit 203, the determining unit 204, the generating unit 205, the transmitting unit 206, the communicating unit 207, the receiving buffers 209, the FDB 210, the switching processing unit 211, and the output queues 212, by causing the CPU 75 to read and execute the switching processing program 770.

Furthermore, the switch device 30 according to the first or the fourth embodiment implements the same functions as those of the calculating unit 300, the setting unit 301, the retaining unit 302, the changing unit 303, the determining unit 304, the communicating unit 307, the receiving buffer 309, the FDB 310, the switching processing unit 311, and the output queue 312, by causing the CPU 75 to read and execute the switching processing program 770.

Furthermore, the switch device 50 according to the second embodiment implements the same functions as those of the calculating unit 500, the setting unit 501, the retaining unit 502, the changing unit 503, the determining unit 504, the ECN writing unit 505, the receiving buffers 509, the FDB 510, the switching processing unit 511, and the output queues 512 by causing the CPU 75 to read and execute the switching processing program 770.

Furthermore, the switch device 20 according to the third embodiment implements the same functions as those of the changing unit 203, the determining unit 204, the generating unit 205, the transmitting unit 206, the communicating unit 207, the receiving buffers 209, the FDB 210, the switching processing unit 211, and the output queues 212 by causing the CPU 75 to read and execute the switching processing program 770.

Furthermore, the switch device 30 according to the third embodiment implements the same functions as those of the changing unit 303, the determining unit 304, the communicating unit 307, the receiving buffers 309, the FDB 310, the switching processing unit 311, and the output queues 312 by causing the CPU 75 to read and execute the switching processing program 770.

The switching process 760 according to the first embodiment executes the processes executed in the switch device 20 illustrated in FIG. 2, e.g., the processes illustrated in FIGS. 9 and 10. The switching process 760 according to the first embodiment also executes the process executed in the switch device 30 illustrated in FIG. 5, e.g., the process illustrated in FIG. 11. All of the processing units virtually implemented by the CPU 75 do not always need to be implemented by the CPU 75, and only the processing units used for a process may be virtually implemented.

The switching processing program 770 does not necessarily need to be stored in the HDD 77 or in the ROM 74 from the beginning. For example, The program may be stored in a portable recording medium such as a flexible disk (FD), a compact disc read-only memory (CD-ROM), a digital versatile disc (DVD), a magneto-optical disk, an integrated circuit (IC) card to be mounted on the computer 70, and the computer 70 may acquire the computer program from the corresponding portable recording medium, and execute the program. The computer 70 may execute the computer program acquired from another computer or a server device storing therein the programs over a public line, the Internet, a local area network (LAN), or a wide area network (WAN).

According to one aspect of the application, it is possible to allow the efficiency of the data packet handling to be reduced less when congestion occurs.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A switch device that receives a data packet transmitted by a transmitter device and transmits the data packet to a receiver device, the switch device comprising:
    a memory; and
    a processor coupled to the memory, wherein
    the processor is configured to:
        receive the data packet transmitted by the transmitter device;
        store the data packet in one of a plurality of output queues provided for respective transmission ports based on a destination of the data packet;
        determine whether an amount of data in any one of the output queues is equal to or more than a first threshold;
        retain a flow table that maps each flow including a series of data packets to be transmitted from the transmitter device to the receiver device, to a flag indicating whether an amount of data to be transmitted by a flow is equal to or more than a second threshold;
        identify, when the amount of data in any one of the output queues is equal to or more than the first threshold, a data packet included in a flow mapped with a flag indicating that the amount of transmitted data is less than the second threshold, from data packets stored in the output queue in which the amount of data is determined to be equal to or more than the first threshold by referring to the flow table; and
        store the identified data packet in an output queue other than the output queue in which the amount of data is determined to be equal to or more than the first threshold.

2. The switch device according to claim 1, wherein the processor is further configured to:
    generate a notifying packet for notifying that congestion has occurred when the amount of data in any one of the output queues is equal to or more than the first threshold; and
    transmit the notifying packet to all of the other switch devices.

3. The switch device according to claim 1, wherein the processor is further configured to:
    generate a notifying packet for notifying that congestion has occurred when the amount of data in any one of the output queues is equal to or more than the first threshold; and
    transmit the notifying packet to another switch device having transmitted the data packet stored in the output queue in which the amount of data is determined to be equal to or more than the first threshold.

4. The switch device according to claim 1, wherein the processor is further configured to:
    calculate a cumulative amount of data in the series of the data packets in each of the flows transmitted from the transmitter device to the receiver device; and
    set a flag indicating that the amount of transmitted data is equal to or more than the second threshold, when the cumulative amount of data becomes equal to or more than the second threshold, to a flow corresponding to the cumulative amount in the flow table.

5. A switch device that receives a data packet transmitted by a transmitter device and transmits the data packet to a receiver device, the switch device comprising:
    a memory; and
    a processor coupled to the memory, wherein
    the processor is configured to:
        retain a flow table that maps each flow including a series of data packets transmitted from the transmitter device to the receiver device to a flag indicating whether an amount of data to be transmitted by a flow is equal to or more than a predetermined threshold;
        receive the data packet transmitted by the transmitter device;
        store the data packet in one of a plurality of output queues provided for respective transmission ports based on a destination of the data packet;
        determine whether a notifying packet for notifying that congestion has occurred, has been received from another switch device;
        identify, when the notifying packet has been received, a data packet included in a flow mapped with a flag indicating that the amount of transmitted data is less than the predetermined threshold from data packets to be transmitted to the other switch device by referring to the flow table; and change where the identified data packet is to be stored to an output queue other than the output queue storing therein the data packets to be transmitted to the other switch device.

6. The switch device according to claim 5, wherein the processor is further configured to:
calculate a cumulative amount of data in the series of the data packets in each of the flows transmitted from the transmitter device to the receiver device; and
set a flag indicating that the amount of transmitted data is equal to or more than the predetermined threshold, when the cumulative amount of data becomes equal to or more than the predetermined threshold, to a flow corresponding to the cumulative amount in the flow table.

7. An information processing system comprising:
a transmitter device;
a receiver device;
a first switch device that forwards a data packet from the transmitter device to the receiver device; and
a second switch device that forwards a data packet from the transmitter device to the receiver device, wherein
the first switch device comprises:
a first memory; and
a first processor coupled to the first memory, wherein the first processor is configured to:
receive the data packet transmitted by the transmitter device;
store the data packet in one of a plurality of first output queues that are provided for respective transmission ports based on a destination of the data packet;
determine an amount of data in any one of the first output queues is equal to or more than a first threshold;
generate a notifying packet for notifying that congestion has occurred when the amount of data in any one of the first output queues is equal to or more than the first threshold; and
transmit the notifying packet to the second switch device, and
the second switch device comprises:
a second memory; and
a second processor coupled to the second memory, wherein
the second processor is configured to:
retain a flow table that maps each flow including a series of data packets transmitted from the transmitter device to the receiver device, to a flag indicating whether an amount of data to be transmitted by a flow is equal to or more than a second threshold;
receive the data packet transmitted by the transmitter device;
store the data packet in one of a plurality of second output queues provided for respective transmission ports based on a destination of the data packet;
determine whether the notifying packet has been received from the first switch device;
identify, when the notifying packet has been received, a data packet included in a flow mapped with a flag indicating that the amount of transmitted data is less than the second threshold from data packets to be transmitted to the first switch device by referring to the flow table; and
change where the identified data packet is to be stored to a second output queue other than the second output queue storing therein the data packets to be transmitted to the first switch device.

8. A method for controlling a switch device includes a memory and a processor coupled to the memory, that receives a data packet transmitted by a transmitter device and transmits the data packet to a receiver device, the method comprising:
receiving a data packet from the transmitter device, using the processor;
storing the received data packet in one of a plurality of output queues provided for respective transmission ports based on a destination of the data packet, using the processor;
determining whether an amount of data in any one of the output queues is equal to or more than a predetermined threshold, using the processor;
retaining a flow table that maps each flow including a series of data packets to be transmitted from the transmitter device to the receiver device, to a flag indicating whether an amount of data to be transmitted by a flow is equal to or more than a second threshold, using the processor;
identifying, when the amount of data in any one of the output queues is equal to or more than the first threshold, a data packet included in a flow mapped with a flag indicating that the amount of transmitted data is less than the second threshold, from data packets stored in the output queue in which the amount of data is determined to be equal to or more than the first threshold by referring to the flow table, using the processor; and
storing the identified data packet in an output queue other than the output queue in which the amount of data is determined to be equal to or more than the first threshold, using the processor.

9. A method for controlling a switch device includes a memory and a processor coupled to the memory, that receives a data packet from a transmitter device and transmits the data packet to a receiver device, the method comprising:
determining whether a notifying packet for notifying that congestion has occurred has been received from another switch device, using the processor;
identifying, when the notifying packet is determined to have been received, a data packet included in a flow mapped with a flag indicating that the amount of transmitted data is less than a predetermined threshold from data packets to be transmitted to the other switch device by referring to a flow table that maps each flow including a series of data packets transmitted from the transmitter device to the receiver device to a flag indicating whether the amount of data to be transmitted by a flow is equal to or more than the predetermined threshold, using the processor; and
changing where the identified data packet is to be stored to an output queue other than the output queue storing therein the data packets to be transmitted to the other switch device, using the processor.

* * * * *